(12) United States Patent
Yeung

(10) Patent No.: US 9,395,531 B2
(45) Date of Patent: Jul. 19, 2016

(54) DRIVER FOR MEMS SPATIAL LIGHT MODULATOR

(71) Applicant: Silicon Light Machines Corporation, Sunnyvale, CA (US)

(72) Inventor: Michael Yeung, Fremont, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 162 days.

(21) Appl. No.: 13/782,527

(22) Filed: Mar. 6, 2013

(65) Prior Publication Data

US 2014/0002887 A1 Jan. 2, 2014

Related U.S. Application Data

(60) Provisional application No. 61/606,171, filed on Mar. 2, 2012.

(51) Int. Cl.
| | |
|---|---|
| *G09G 3/34* | (2006.01) |
| *G02B 26/00* | (2006.01) |
| *G02B 26/08* | (2006.01) |
| *G09G 3/20* | (2006.01) |

(52) U.S. Cl.
CPC ............ *G02B 26/00* (2013.01); *G02B 26/0808* (2013.01); *G09G 3/2011* (2013.01); *G09G 3/3473* (2013.01); *G09G 2300/0426* (2013.01); *G09G 2310/0272* (2013.01)

(58) Field of Classification Search
CPC ...... G02B 26/005; G02B 6/34; G02B 5/1861; G02B 26/0833; G02B 5/1809; G02B 27/0172; G02B 26/004; G02B 26/007; G02B 26/02; G02B 2027/0178; G02B 26/023; G02B 3/14; G02B 26/0808; G02B 26/0841; G02B 5/1842; G02B 1/12

USPC ................ 359/290, 291, 295, 569, 572, 573; 385/19, 37, 140, 901; 398/118–119, 398/183, 186, 188, 201, 203–204, 207
See application file for complete search history.

(56) References Cited

U.S. PATENT DOCUMENTS

| | | | |
|---|---|---|---|
| 3,576,573 A * | 4/1971 | Symons | ......................... 360/63 |
| 6,359,460 B1 * | 3/2002 | Tanaka | ................... G01D 3/036 324/756.06 |
| 6,767,751 B2 | 7/2004 | Hunter | |
| 6,967,760 B2 | 11/2005 | Hunter | |
| 7,154,587 B2 | 12/2006 | Bleeker | |

(Continued)

OTHER PUBLICATIONS

STIC Search Report 13782527.*

*Primary Examiner* — James Greece
*Assistant Examiner* — Sharrief Broome
(74) *Attorney, Agent, or Firm* — William Nuttle

(57) ABSTRACT

A spatial light modulator (SLM) module and methods of designing, manufacturing and using the same are provided. In one embodiment, the SLM module comprises a diffractive, diffractive SLM formed on a substrate, the SLM including a plurality of pixels each including a plurality of electrostatically deflectable actuators, and a driver including a number of drive channels each coupled to one of the plurality of electrostatically deflectable actuators. Each of the drive channels include at least one internal digital-to-analog converter (DAC) integrally formed on the same substrate as the SLM. In one embodiment, the DAC is a multi-slope charge integrating DAC. In other embodiments, the driver includes circuitry to test each of the drive channels, and a spare drive channel that can be switched in to replace a defective drive channel.

14 Claims, 29 Drawing Sheets

(56) References Cited

U.S. PATENT DOCUMENTS

| | | | |
|---|---|---|---|
| 7,321,417 B2 | 1/2008 | Bleeker | |
| 7,573,631 B1* | 8/2009 | Amm | 359/245 |
| 2003/0098859 A1* | 5/2003 | Udo et al. | 345/204 |
| 2004/0217294 A1* | 11/2004 | Zur | G01T 1/2018 250/370.09 |
| 2005/0062631 A1* | 3/2005 | Washburn et al. | 341/144 |
| 2005/0237743 A1 | 10/2005 | Payne et al. | |
| 2005/0248901 A1* | 11/2005 | Desuche | G06F 15/7814 361/149 |
| 2008/0172570 A1* | 7/2008 | Hsu et al. | 714/3 |
| 2008/0174527 A1 | 7/2008 | Hattori | |
| 2011/0140772 A1* | 6/2011 | Sengupta et al. | 330/2 |

\* cited by examiner

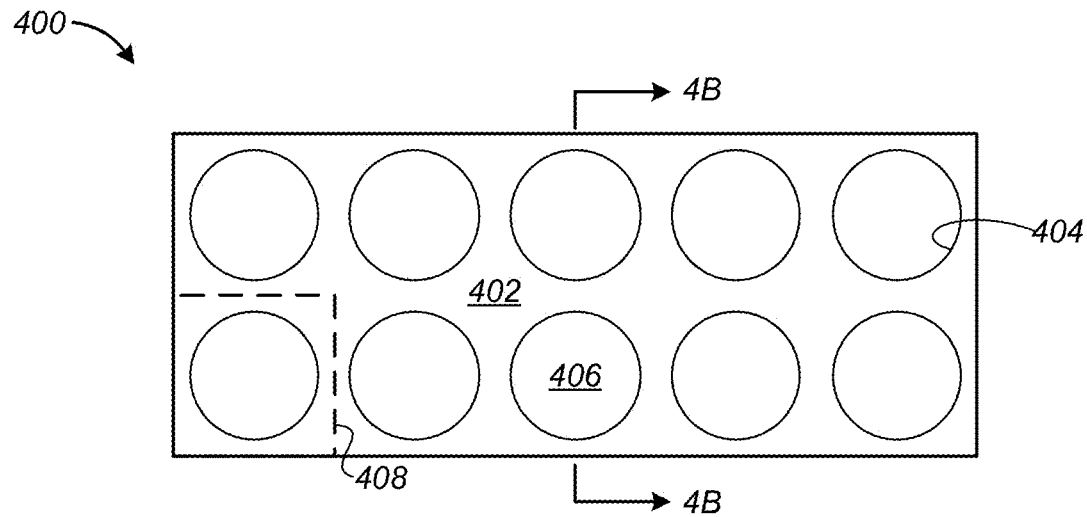
FIG. 4A
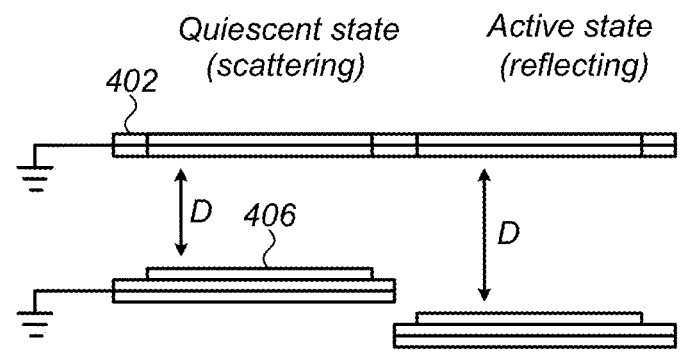
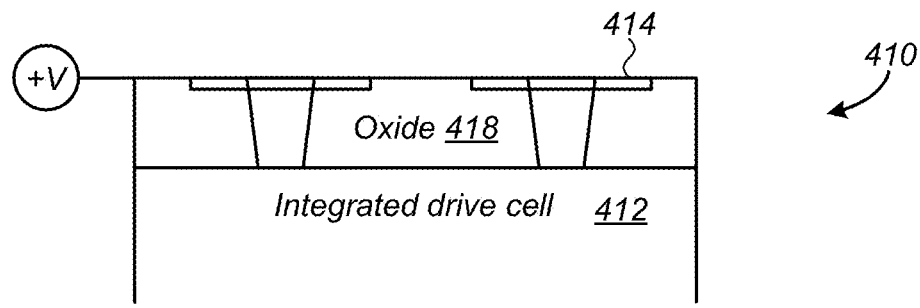
FIG. 4B

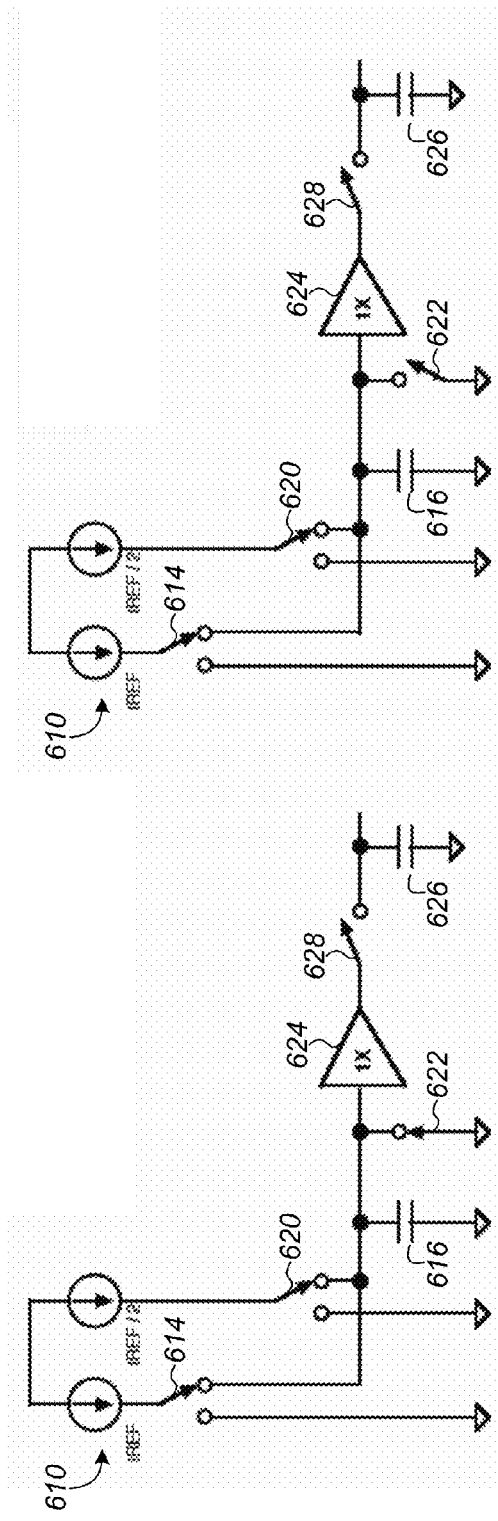
FIG. 6B
FIG. 6C
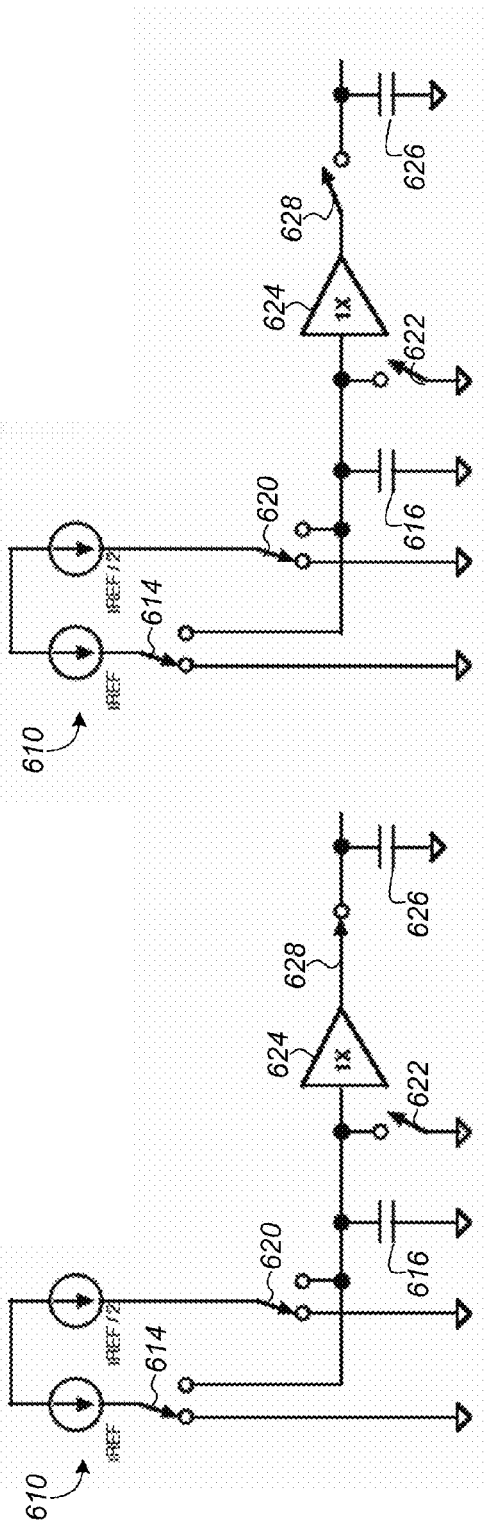
FIG. 6D
FIG. 6E

DRIVER FOR MEMS SPATIAL LIGHT MODULATOR

CROSS-REFERENCE TO RELATED APPLICATIONS

The present application claims the benefit of priority under 35 U.S.C. 119(e) to U.S. Provisional Patent Application Ser. No. 61/606,171, entitled "Driver Design for MEMS Spatial Light Modulator," filed Mar. 2, 2012, which application is hereby incorporated by reference in its entirety.

TECHNICAL FIELD

The present invention relates generally to spatial light modulators, and more particularly to spatial light modulators and to methods of designing, manufacturing, testing and improving the performance and reliability of the same.

BACKGROUND

Spatial light modulators or SLMs are used in various applications, including display systems, optical information processing and data storage, printing, and maskless lithography. One particularly useful type of microelectromechanical systems (MEMS) SLM is a diffractive spatial light modulator (SLM), such as a Grating Light Valve (GLV™) commercially available from Silicon Light Machines, Inc., of Sunnyvale, Calif. GLVs™ are ribbon-type SLM that use electrostatic forces to move actuators or ribbons to produce diffraction between light reflected from adjacent actuators, thereby modulating light incident thereon. The incident light beam can be modulated in intensity, phase, polarization or direction.

Drive circuitry or drivers to generate signals to operate SLMs are made using CMOS or other semiconductor fabrication technologies, which are similar to but distinct from and often incompatible with fabrication technologies used to fabricate the SLM. Thus, SLMs are typically built on a substrate separate from that used to form some or all the associated drivers, and are typically connected to the drivers by wire bonds. In particular, existing SLM drivers generally include a number of external digital-to-analog converters (DACs) to convert digital imaging signals to analog signals used to drive the SLM. Shortcomings of existing SLMs using drivers with external DACs include larger size, due to the need for a separate substrate for the external DACs, the inclusion of additional wire bonding pads on the SLM substrate, lower operating speeds due to delays introduced by the wire bonds in the signal path to the SLM, and higher costs of the external DACs, which must be high speed DACs to offset, at least in part, delays introduced by the wire bonds.

Accordingly, there is a need for a monolithic SLM module including integrated drivers and a manufacturing process combining the SLM and substantially all of its associated drivers, including DACs, into a single integrated circuit (IC) fabricated on single substrate.

SUMMARY

A spatial light modulator (SLM) module and methods of designing, manufacturing and using the same are provided.

In a first aspect, the SLM module comprises a diffractive SLM formed on a substrate, the SLM including a plurality of pixels each including a plurality of electrostatically deflectable actuators or ribbons, and a driver including a number of drive channels each coupled to one of the plurality of electrostatically deflectable actuators. Each of the drive channels include at least one internal digital-to-analog converter (DAC) integrally formed on the same substrate as the SLM. In one embodiment, the DAC is a multi-slope charge integrating DAC. In other embodiments, the drive channels can include a double or triple sample and hold architecture, and may be operated using pulse width modulation.

In another aspect, the driver further includes circuitry to test each of the drive channels, and a spare drive channel that can be switched in to replace a defective drive channel. In one embodiment, the spare drive channel is in a middle of an array of 256 drive channels and the driver further includes circuitry to switch each drive channel between the spare and the defective drive channel to an adjoining actuator until the spare is switched in and the defective drive channel is switched out.

BRIEF DESCRIPTION OF THE DRAWINGS

These and various other features of an integrated monolithic spatial light modulator and methods of fabricating and operating the same will be apparent upon reading of the following detailed description in conjunction with the accompanying drawings and the appended claims provided below, where:

FIG. 4A is a schematic block diagram of a planar top view of a portion of an array of dense-packed, two-dimensional (2D) modulators according to another embodiment of the present disclosure;

FIG. 4B is a schematic sectional side view of two adjacent modulators of the array of FIG. 4A;

FIGS. 6B-E are schematic block diagrams of the DAC of FIG. 6A illustrating a DAC conversion sequence according to an embodiment of the present disclosure;

FIGS. 23A and 23B are schematic block diagrams of test circuitry for a driver for a monolithic integrated SLM according to an embodiment of the present disclosure;

DETAILED DESCRIPTION

Figure 1A:
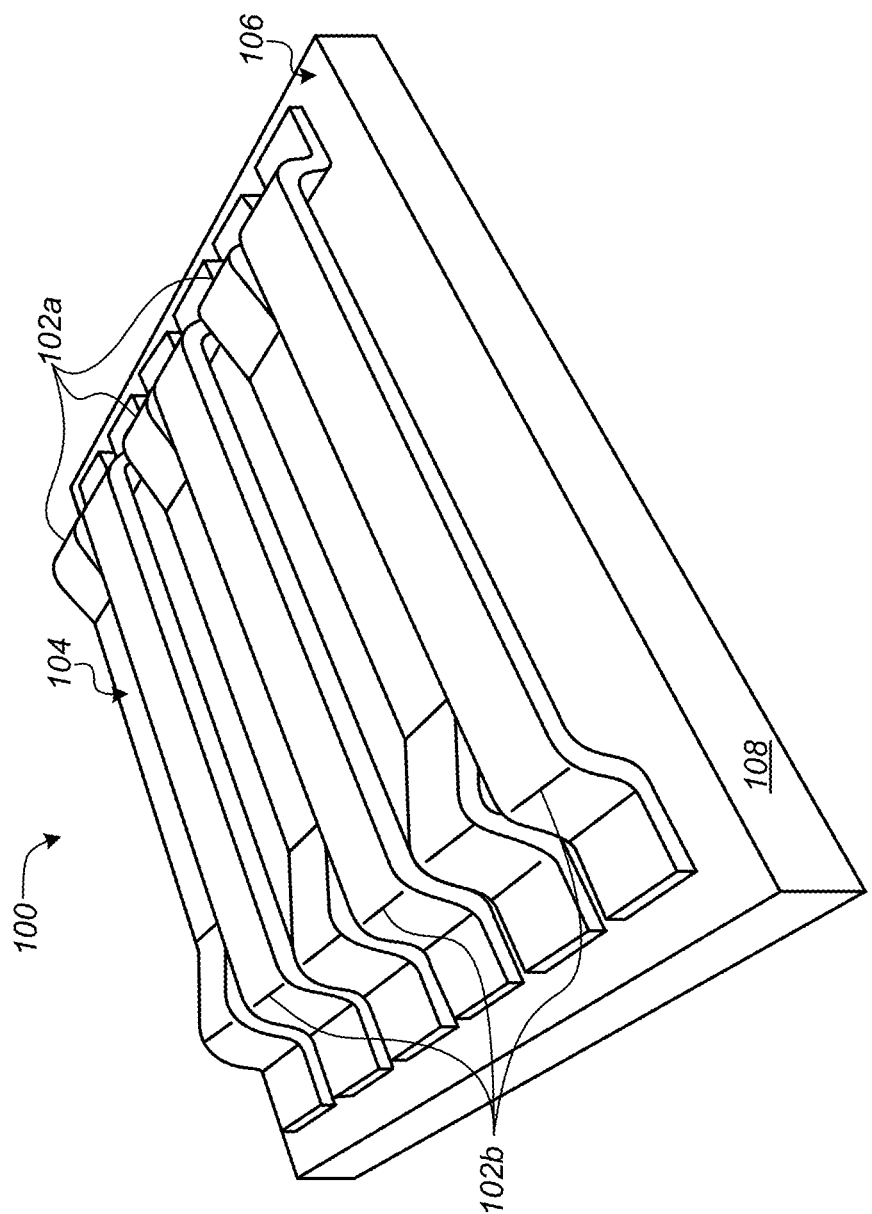
FIG. 1A is a perspective view of a diffractive spatial light modulator (SLM)

The present invention is directed to monolithic integrated spatial light modulators (SLMs) and to methods of manufacturing, testing and improving the performance and reliability of the same.

Monolithic integrated SLMs according to the present invention will now be described with reference to FIGS. 1A through 27. For purposes of clarity, many of the details of spatial light modulators in general and diffractive spatial light modulators in particular that are widely known and are not relevant to the present invention have been omitted from the following description. The drawings described are only schematic and are non-limiting. In the drawings, the size of some of the elements may be exaggerated and not drawn to scale for illustrative purposes. The dimensions and the relative dimensions may not correspond to actual reductions to practice of the invention.

A perspective view of a pixel or sub-pixel of a SLM according to an embodiment of the present disclosure is shown in FIG. 1. Referring to FIG. 1A, a diffractive spatial light modulator 100, such as a Grating Light Valve (GLV™) commercially available from Silicon Light Machines, Inc., of Sunnyvale, Calif., generally includes a number of ribbons or actuators 102a, 102b, each having a light reflective surface 104 supported over a surface 106 of a substrate 108. One or more of the actuators 102a are deflectable toward the substrate 108 to form an addressable diffraction grating with adjustable diffraction strength. The actuators are 102a deflected 108 by electrostatic forces towards base electrodes (not shown in this figure) formed in or on the substrate when a voltage is applied between the deflectable actuators 102a and the base electrodes. The applied voltages are controlled by drive electronics (not shown in this figure), which may be integrally formed in or on the surface 106 of the substrate 108 below or adjacent to the actuators 102. Light reflected from the movable actuators 102a adds as vectors of magnitude and phase with that reflected from stationary actuators 102b or a reflective portion of the surface 106 beneath the actuators, thereby modulating light reflected from the SLM 100 from fully reflected to fully diffracted or extinguished. By fully reflected it is meant the reflected component is the same as the diffracted 0th-order component. So the light is fully reflected if all the incoming light is diffracted into the 0th-order only, and fully diffracted if diffracted if it is diffracted to 1st, 2nd, or 3rd, but not the 0th-order (i.e. vanishing 0th-order).

Figures 1B, 1C:
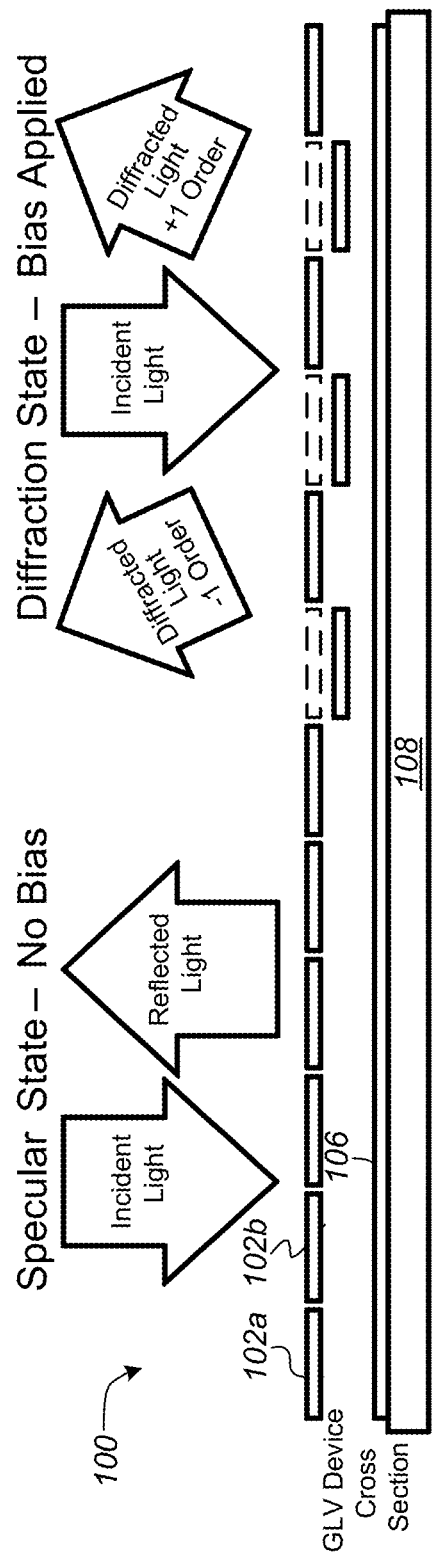
FIGS. 1B and 1C are schematic cross-sectional views of a pixel of the diffractive SLM of FIG. 1A in a specular and a diffraction state.

Schematic cross-sectional views of a pixel of the SLM 100 of FIG. 1A in a non-diffracting or specular state and a diffraction states are shown in FIGS. 1B and 1C respectively.

Figure 2:
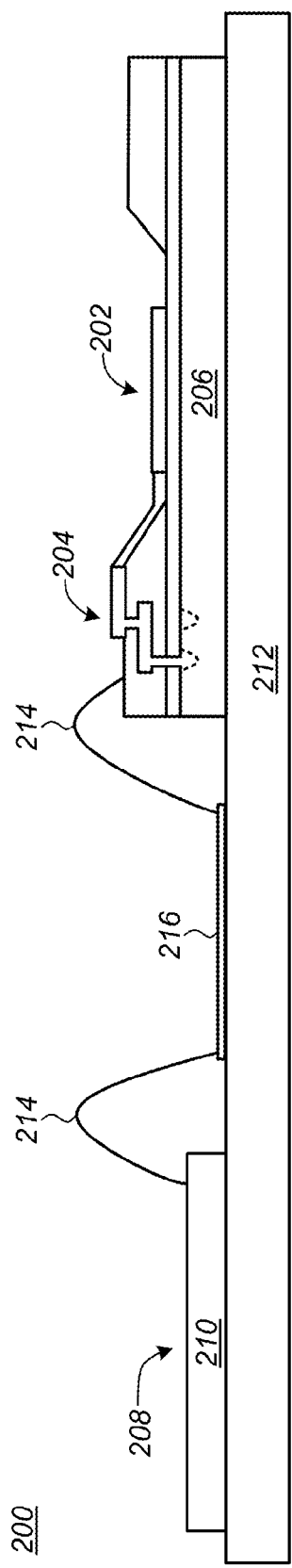
FIG. 2 is a schematic cross-sectional view of a multi-chip module including a SLM connected to external digital-to-analog converters (DACs) by wire bonds.

FIG. 2 is a schematic cross-sectional view of a multi-chip device or module 200 including a microelectromechanical systems (MEMs) SLM 202 partially integrated with at least some circuitry of associated drivers 204 on a common die or substrate 206, but electrically coupled to external, high-speed digital-to-analog converters (DACs) 208 on one or more separate dies or substrates 210. The MEMs substrate 206 and the substrate 210 on which the DACs 208 are formed can be mounted to a common backplane, such as a printed circuit board (PCB 212) or lead frame of a multi-chip package. The SLM 202 is electrically coupled to the external DACs 208 by wire bonds 214 and/or traces 216 in the PCB 212. The SLM 202 is fabricated using MEMs technologies, including deposition, masking and removal of dielectric, conducting and reflective layers. The drivers 204, including the external DACs 208 on the separate substrate 210, can be fabricated using any suitable semiconductor fabrication technology including, for example, complimentary-metal-oxide-semiconductor (CMOS) technology. This embodiment works well for applications requiring channel or pixel densities of about 8192 channels or less, for applications requiring only modest switching speeds, and for applications in which a relatively large module 200 sizes is not detrimental.

Problems with the above embodiment include that the external DACs 208 must drive substantial wiring capacitances from the substrates 206, 210, wire bonds 214, traces 216 in the PCB 212, and electrostatic discharge or ESD protection (not shown) frequently included in circuitry of one or both of the substrates. Driving these capacitances results in the need for low source impedances in the external DACs 208, which require high current. Moreover, the high bandwidth analog inputs required to receive signals from the external DACs 208 cannot filter noise coupled sources on the PCB including digital signals and other high speed analog circuitry since many of these noise frequencies may be in-band. Thus, fully differential analog inputs are required to transfer high resolution high bandwidth analog signals without coupling noise from sources on the PCB, increasing the complexity, cost and power consumption of the SLM module 200.

Figure 3:
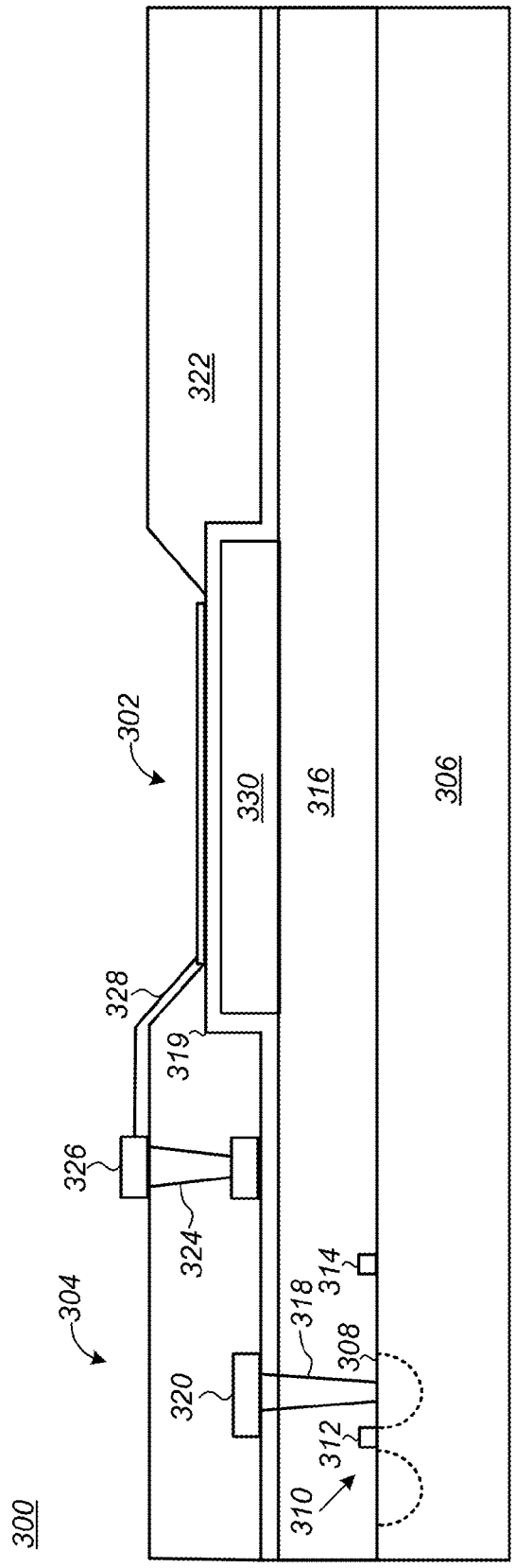
FIG. 3 is a schematic cross-sectional view of a monolithic integrated SLM according to an embodiment of the present disclosure.

In an improved embodiment and a first aspect of the present invention, shown in FIG. 3, the SLM module is a monolithic integrated SLM module 300 including a MEMs SLM 302 integrated with substantially the complete circuitry of the associated drivers 304, including internal DACs, on a common die or substrate 306. In forming the monolithic integrated SLM 302, diffusion regions 308 (source and drains) for transistors 310 of the drivers 304 are formed first, followed by polysilicon (Poly-Si) gates 312 and gate lines 314 and a first interlevel dielectric (ILD1) 316. Contacts or vias 318 to the diffusion regions 308 are formed and the surface of the ILD1 is polished or planarized, typically using CMP. Next a sacrificial polysilicon layer (not shown) is deposited and patterned, and a silicon nitride structural layer 319 deposited thereon. A first metal layer (metal 1) 320 is deposited and patterned, a second interlevel dielectric (ILD2) 322 formed and more contacts or vias 324 to metal1 from a second metal layer (metal 2) 326. The dielectric over the SLM 302 is removed, a interconnect 328 to the SLM formed, and the actuators of the SLM formed and the sacrificial polysilicon layer underlying the actuators is removed to form a cavity 330 releasing the actuators.

The internal DACs of the above embodiment improve performance by reducing if not eliminating capacitances from packages, PCB wiring, and ESD protection, eliminating the need for low source impedances and high current in the DACs. A further advantage of the above embodiment is the elimination of the need for high bandwidth analog inputs and the reduction if not elimination of in-band noise from sources on a PCB. In addition, the fully integrated monolithic SLM module 300 including drivers 304, increases pixel densities and switching speeds, while decreasing the size, complexity, cost and power consumption of the SLM module.

In another embodiment, the monolithic integrated SLM includes an array of 2D modulators each including two films or membranes having light reflecting surfaces of substantially equal area and reflectivity disposed above an upper surface of a substrate. One such SLM is a Planar Light Valve (PLV™), commercially available from Silicon Light Machines, Inc., of Sunnyvale, Calif. An embodiment of 2D modulator arrays suitable for use with the diffractive SLM of the present invention will now be described with reference to FIGS. 4A through 4C. For purposes of clarity, many of the details of 2D modulators and methods of forming the same that are not relevant to the present invention have been omitted from the following description. Two dimensional spatial light modulators are described in more detail in, for example, commonly assigned U.S. Pat. No. 7,064,883 to Payne et al., entitled "Two dimensional spatial light modulator," which is hereby incorporated by reference in its entirety.

FIG. 4A is a plan view of a portion of an array 400 of dense-packed, two-dimensional (2D) modulators. The array 400 generally has two films or membranes having light reflecting surfaces of equal area and reflectivity disposed above an upper surface of a substrate (not shown in this figure). The topmost film is a static tent membrane or member 402 of a uniform, planar sheet of a material having a first planar light reflective surface, for example taut silicon-nitride covered on at least one side with an aluminized surface. The tent member 402 has an array of apertures 404 extending from the top reflective surface of the member to a lower surface (not shown). The tent member 402 covers an actuator membrane underneath. The actuator membrane includes a number of flat, displaceable or movable actuators 406. The actuators 406 have second planar light reflective surfaces parallel to the first planar light reflective surface of the tent member 402 and positioned relative to the apertures 404 to receive light passing therethrough. Each of the actuators 406, the associated apertures 404 and a portion of the tent member 402 immediately adjacent to and enclosing the aperture form a single, individual modulator 408 or diffractor. The size and position of each of the apertures 404 are chosen to satisfy an "equal reflectivity" constraint. That is the area of the second reflective surface exposed by a single aperture 404 inside is substantially equal to the reflectivity of the area of the individual modulator 408 outside the aperture 404.

FIG. 4B depicts a cross-section through two adjacent modulators 408 of the array 400 of FIG. 4A. In this exemplary embodiment, the upper tent member 402 remains static, while the lower actuator membrane or actuators 406 move under electrostatic forces from integrated electronics or drive circuitry in the substrate 410. The drive circuitry generally includes an integrated drive cell 412 coupled to substrate or drive electrodes 414 via interconnect 416. An oxide 418 may be used to electrically isolate the electrodes 414. The drive circuitry is configured to generate an electrostatic force between each electrode 414 and its corresponding actuator 406.

Individual actuators 406 or groups of actuators are moved up or down over a very small distance (typically only a fraction of the wavelength of light incident on the array 400) relative to first planar light reflective surface of the tent member 402 by electrostatic forces controlled by drive electrodes 414 in the substrate 410 underlying the actuators 406. Preferably, the actuators 406 can be displaced by n*λ/4 wavelength, where λ is a particular wavelength of light incident on the first and second planar light reflective surfaces, and n is an integer equal to or greater than 0. Moving the actuators 406 brings reflected light from the second planar light reflective surface into constructive or destructive interference with light reflected by the first planar light reflective surface (i.e., the tent member 402), thereby modulating light incident on the array 400.

For example, in one embodiment of the array 400 shown in FIG. 4B, the distance (D) between reflective layers of the tent 402 and actuator 406 may be chosen such that, in a non-deflected or quiescent state, the tent member, or more accurately the first reflective surface, and the actuator (second reflective surface), are displaced from one another by an odd multiple of λ/4, for a particular wavelength λ of light incident on the array 400. This causes the array 400 in the quiescent state to scatter incident light, as illustrated by the left actuator of FIG. 4B. In an active state for the array 400, as illustrated by the right actuator of FIG. 4B, the actuator 406 may be displaced such that the distance between the reflective surfaces of the tent member 402 and the actuator 406 is an even multiple of λ/4 causing the array 400 to reflect incident light.

In an alternative embodiment, not shown, the distance (D) between reflective layers of the tent 402 and actuator 406 can be chosen such that, in the actuator's quiescent state, the first and second reflective surfaces are displaced from one another by an even multiple of λ/4, such that the array 400 in quiescent state is reflecting, and in an active state, as illustrated by the right actuator, the actuator is displaced by an odd multiple of λ/4 causing it to scatter incident light.

The size and position of each of the apertures 404 are predetermined to satisfy the "equal reflectivity" constraint. That is the reflectivity of the area of a single aperture 404 inside is equal to the reflectivity of the remaining area of the cell that is outside the aperture 404.

Figure 4C:
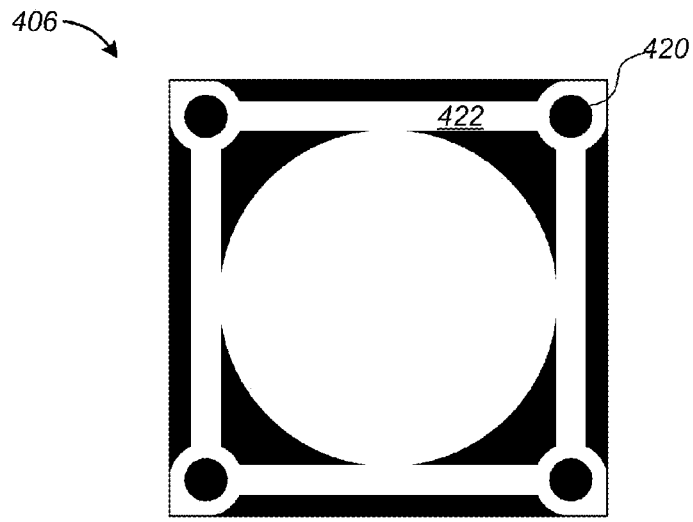
FIG. 4C is a schematic block diagram of an actuator of a single modulator o of the array of FIG. 4A.

A close up planar view of a single actuator is shown in FIG. 4C. Referring to FIG. 4C, the actuator 406 is anchored or posted to the underlying substrate (not shown in this figure) by a number of posts 420 at the corner of each actuator. The actuators 408 include uniform, planar disks each having a planar reflective surface and flexibly coupled by hinges or flexures 422 of an elastic material to one or more of the posts 420. For example, the reflective surfaces the actuators 406 can include aluminized disks attached to a taut silicon-nitride film, and flexibly coupled to the posts by narrow, non-aluminized flexures of the same silicon-nitride film. Anchoring posts 420 and flexures 422 are hidden in the area concealed by the overlying tent member 402, thereby providing the array 400 with a large étendue and substantially 100% diffraction efficiency. The actuator 406 also includes, in addition to the aluminum layer and the silicon-nitride (SiN) layer, an electrically conductive film or layer, such as a titanium-nitride (TiN) layer. The electrically conductive layer is electrically coupled to electrical ground in the substrate through one or more of the posts 420 so that a voltage applied to the drive electrode electrically 414 deflects actuators toward or away from the substrate.

Although the light reflective surface of the actuator 406 is shown and described above as being positioned below the light reflective surface of the tent member 402 and between the first reflective surface and the upper surface of the substrate, it will be appreciated that the light reflective surface of the actuator can alternatively be raised above the movable actuator to be positioned coplanar with or above the light reflective surface of the tent member 402.

In one embodiment, the diffractive SLM is a linear dense-packed spatial light modulator (LDSLM) including a plurality of two dimensional (2D) modulators grouped proximal to one another on a surface of a substrate to form a linear array having a plurality of pixels along a longitudinal axis of the array. Each pixel includes a number of 2D modulators electrically coupled to receive a common drive signal and to modulate light reflected therefrom in response to the drive signal. Preferably, each pixel includes at least two 2D modulators grouped along a transverse axis, perpendicular to the longitudinal axis of the array and parallel to the surface of the substrate. More preferably, the number of 2D modulators along the transverse axis each pixel is selected to provide a desired power density while avoiding an undesired thermal gradient across the LDSLM.

Figure 5:
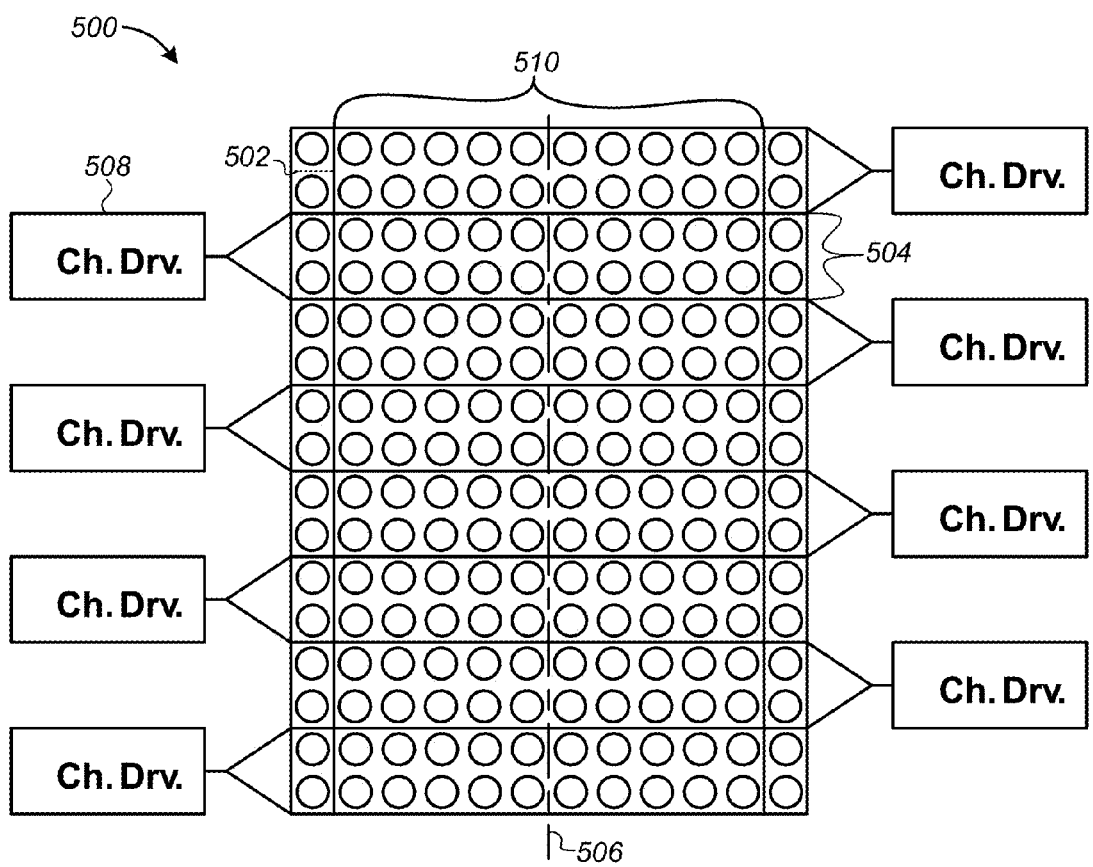
FIG. 5 is a planar top view of a linear dense-packed SLM (LDSLM) according to an embodiment of the present disclosure.

An exemplary LDSLM 500 comprising a linear array of dense-packed, 2D modulators 502 will now be described with reference to the diagrams of FIG. 5. FIG. 5 is a planar top view of an LDSLM according to an embodiment of the present invention.

Referring to FIG. 5, in one embodiment the 2D modulators 502 are grouped into a linear array of interleaved channels or pixels 504 along a longitudinal axis 506. Each of the 2D modulators 502 in a single pixel 504 share a common drive channel or channel driver (Ch. Drv. 508). Although in the embodiment shown each pixel 504 is depicted as having 2 rows of 12 modulators grouped along a transverse axis perpendicular to the longitudinal axis of the array, it will be appreciated that each channel or pixel can include any number of 2D modulators arranged in any number of rows of any length across the width or transverse axis of the array without departing from the spirit and scope of the invention. Similarly, the LDSLM 500 can include a linear array of any number of pixels 504 or a number of linear arrays placed end to end. Because each of the 2D modulators 502 in a pixel 504 is deflected by the same amount, optimally a multiple of a quarter wavelength (λ/4) of the incident light for maximum diffraction, the width (W) of the illuminated portion 510 of the LDSLM 500 can be arbitrarily wide up to or exceeding a length (L) of the pixel 504, with substantially no impact on the contrast or modulation efficiency of the LDSLM.

Figure 6A:
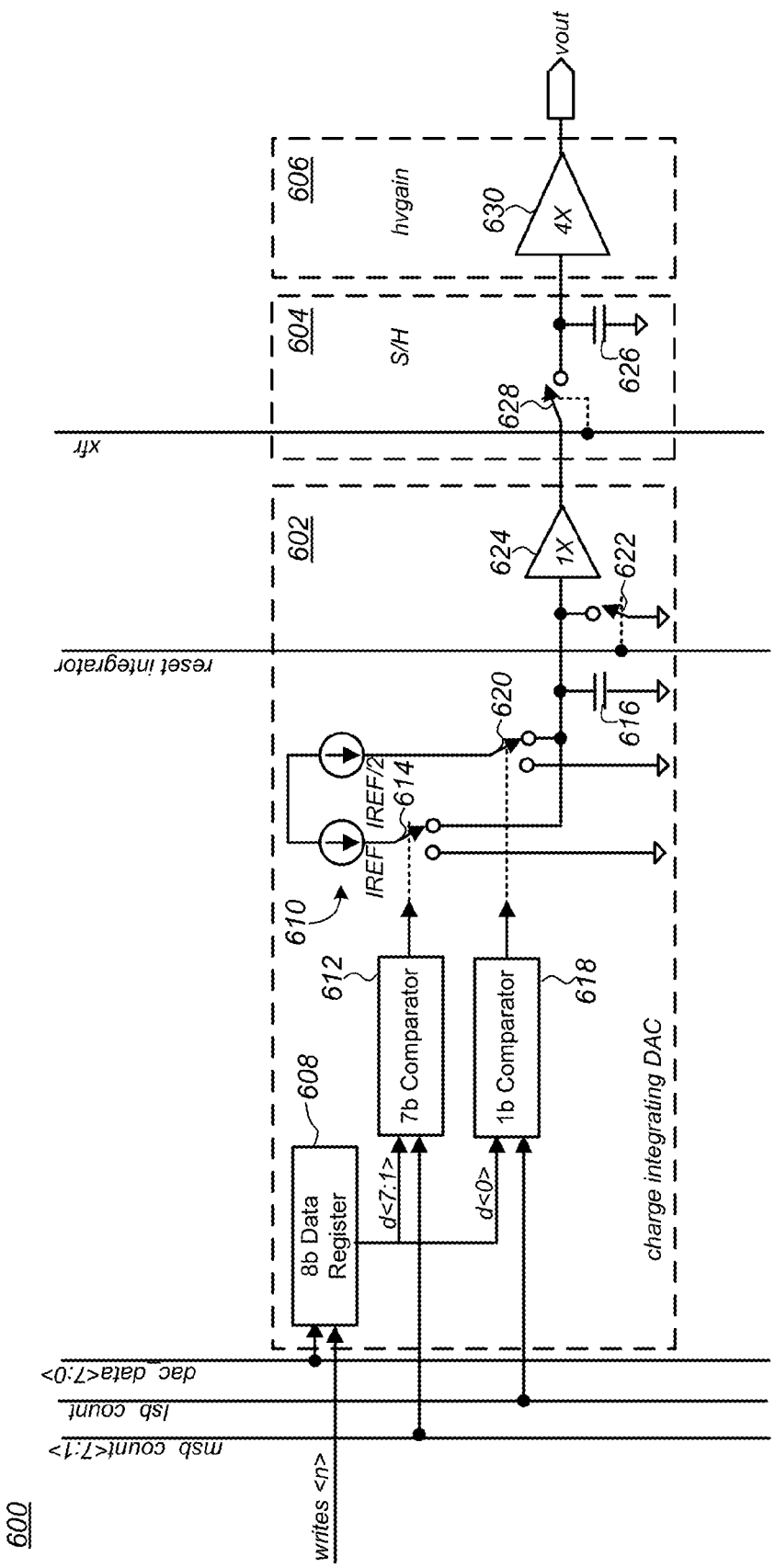
FIG. 6A is a block diagram of a single drive channel of a driver for a monolithic integrated SLM including internal charge integrating digital-to-analog converter (DAC) according to an embodiment of the present disclosure.

FIG. 6A is a conceptual block diagram of a single drive channel of a driver for a monolithic integrated SLM including internal charge integrating digital-to-analog converter (DAC) according to an embodiment of the present disclosure. Referring to FIG. 6A, the drive channel or driver 600 generally includes at least one internal (DAC 602) coupled to sample-and-hold (S/H) stage 604 including one or more S/H sub-circuits or sub-stages, and through the S/H stage to an high voltage output stage (hvgain 606) to drive one or more actuators in a monolithic integrated SLM (not shown in this figure). Generally, the DAC 602 includes an 8b data register 608 for receiving and storing data relating to the digital signal to be converted, and in order to reduce the number of clock cycles required for the conversion two ratioed current sources 610. The DAC 602 further includes a 7b comparator 612 for receiving data and a clock signal related to a most significant bit (MSB) and controlling a first switching element or circuit 614 to electrically couple current to an integrating capacitor 616, and a 1b comparator 618 for receiving data and a clock signal related to a least significant bit (LSB) and controlling a second switching element or circuit 620 to electrically couple current to the integrating capacitor, a reset switch 622, and a unity gain operational amplifier (Op-Amp) 624.

The S/H stage 604 comprises a sampling capacitor 626 and a switching element or circuit 628 to couple and decouple the S/H stage to an output of the DAC 602.

The high voltage output stage (hvgain 606) can include one or more amplifier stages 630, and one embodiment of which is described in detail below with reference to FIG. 20.

FIGS. 6B-E are schematic block diagrams of the DAC 602 of FIG. 6A illustrating a DAC conversion sequence according to an embodiment of the present disclosure. Referring to FIG. 6B, in a first step or stage, reset switch 622 is closed to couple the integrating capacitor 616 to ground. Next, in a second stage, shown in FIG. 6C, the reset switch 622 is opened allowing a charge to accumulate or integrate on the integrating capacitor 610. In FIG. 6D switches 614 and 620 of the current sources 610 are decoupled from the integrating capacitor 616 to ground, and the S/H switching element or circuit 628 closed to electrically couple the integrated charge or signal to the sampling capacitor 626. Finally, in a fourth stage, shown in FIG. 6E, the conversion is complete and S/H switch 628 is opened.

Figure 7:
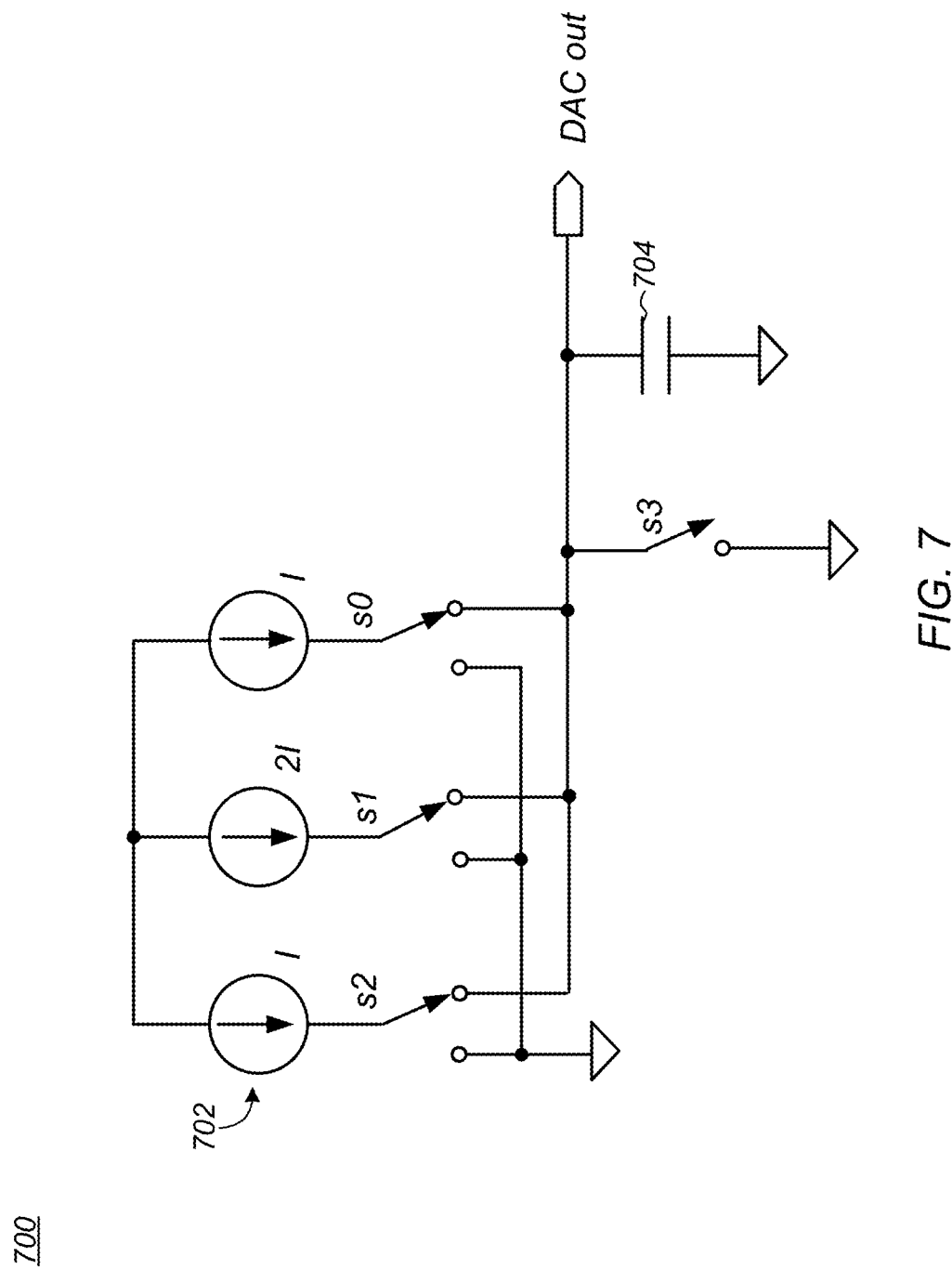
FIG. 7 is a schematic block diagram of an internal binary weighted integrating DAC for use with a monolithic integrated SLM according to another embodiment of the present disclosure.

FIG. 7 is a schematic block diagram of an internal binary weighted integrating DAC 700 according to another embodiment of the present disclosure. In the embodiment shown, the DAC 700 includes three ratioed current sources 702 and three switching elements or circuits, s0, s1 and s2, through which current from the current sources is electrically coupled to an integrating capacitor 704, and a reset switch s3. As with the embodiment described above with respect to FIG. 6A, switching elements or circuits s0, s1 and s2, are controlled by a number of comparators (not shown in this figure) each of which receive data and a clock signal related to one or more bits of the digital signal being converted.

Figure 8A:
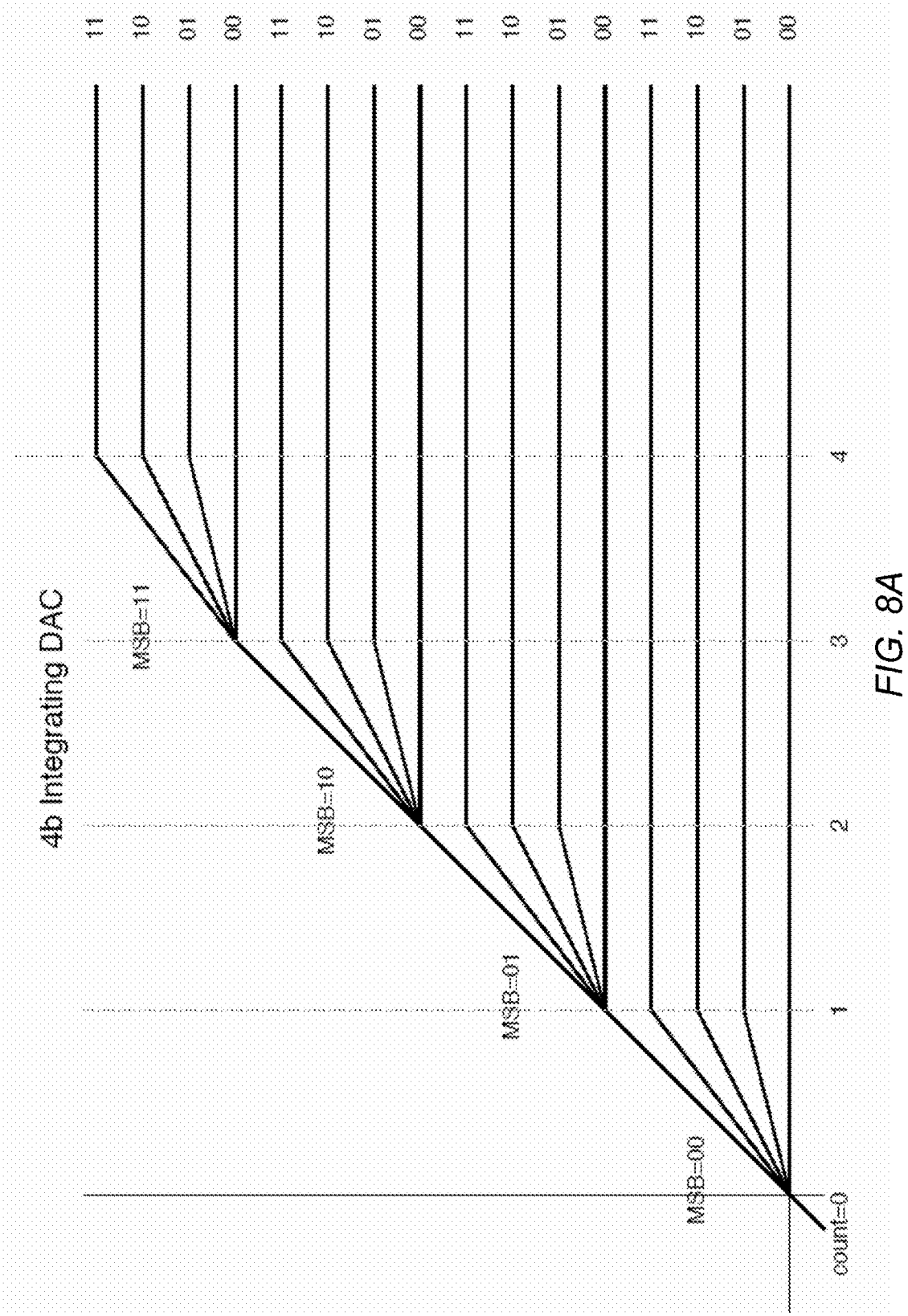
FIGS. 8A-D are graphs of DAC output over time and illustrates the improved resolution achieved with internal DACs according to various embodiments of the present disclosure.
Figure 8B:
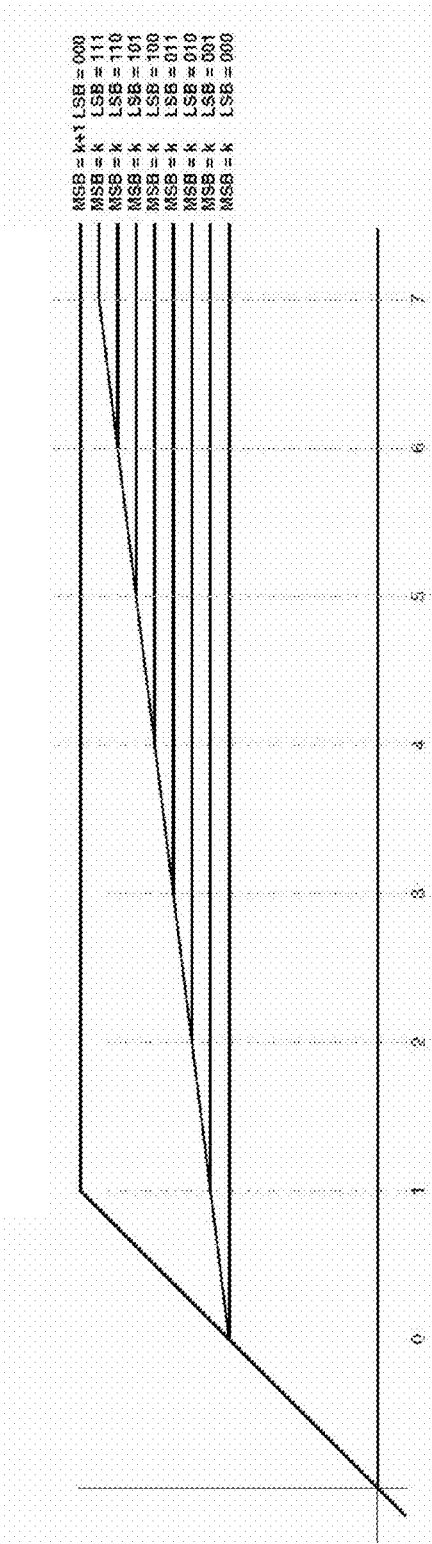
Figure 8C:
Figure 8D:
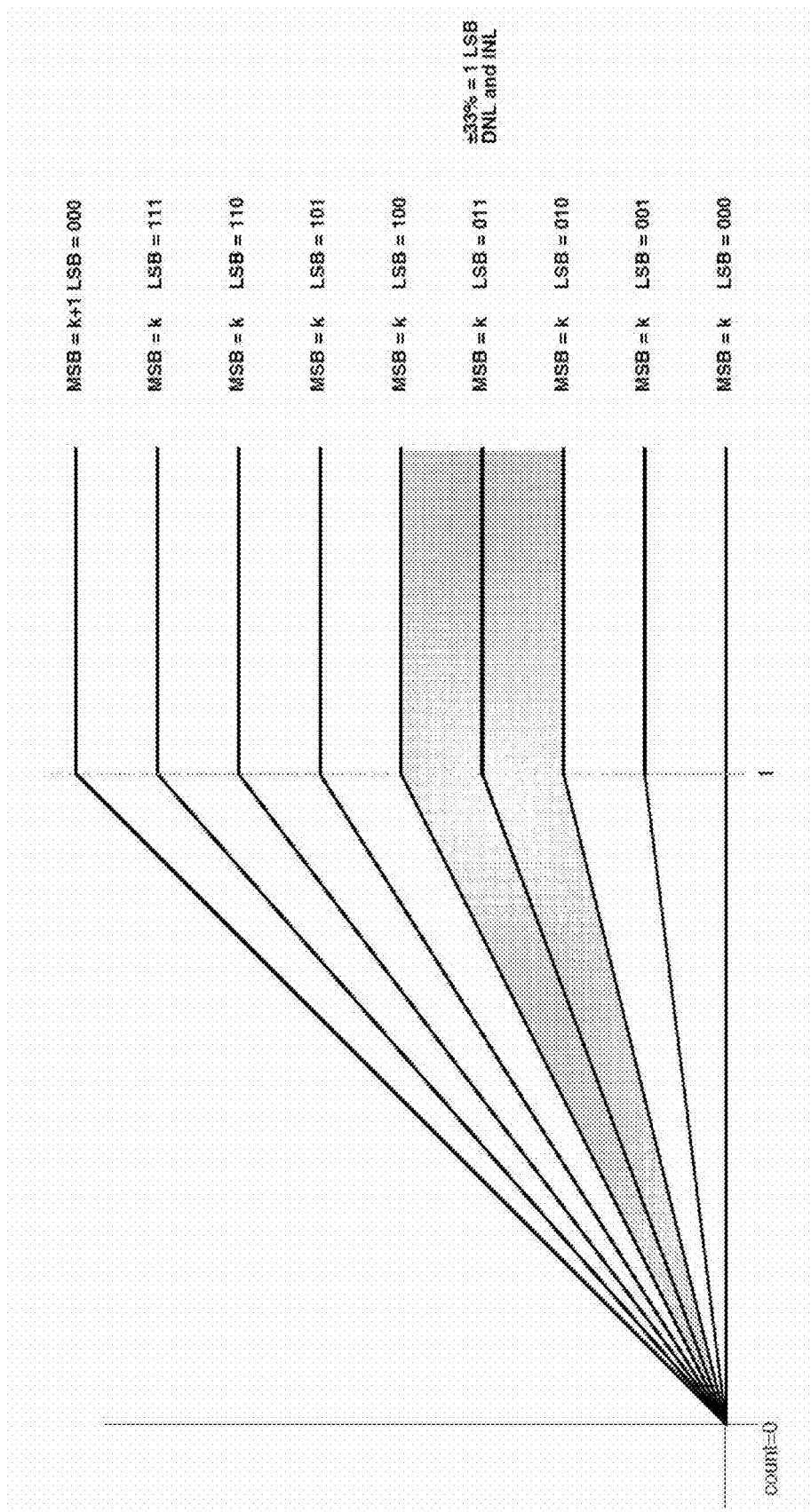

FIGS. 8A and 8D are graphs of DAC output over time for a 4b integrating DAC, such as that shown in FIG. 7, and illustrates the improved resolution achieved with internal DACs according to various embodiments of the present disclosure. Referring to FIG. 8A, it is noted that the number of integration clocks required is $2^n$ where n is the number of MSB bits. It is further noted that the output of the DAC is monotonic to at least the number of MSBs+1. Referring to FIGS. 8B and 8C, with the architecture shown in FIG. 4A-D. It is noted that a current ratio between the current sources need only be kept to within 14% in order to provide monotonicity and less than 1 least significant (LSB) integral nonlinearity (INL) and differential nonlinearity (DNL).

Finally, referring to FIG. 8D, it is noted that with a binary weighted DAC or DAC array the greatest non-linearity occurs at the major carry. In the embodiment the output for which is illustrated in FIG. 8D this occurs when switching from LSB=011 to LSB=100. In this case, the mismatch error on the transistors that generate the 011 value would have to be 33% to have a DNL error of 1 LSB. Additionally, with three transistors, the RMS error would be 0.58 times that of a single transistor. Thus, it is seen that for a binary weighted DAC of the present disclosure, matching requirements for the transistors of the DAC are relaxed and in addition, the matching is significantly improved for transistors of a given size as compared to a conventional DAC configuration or architecture.

Figure 9:
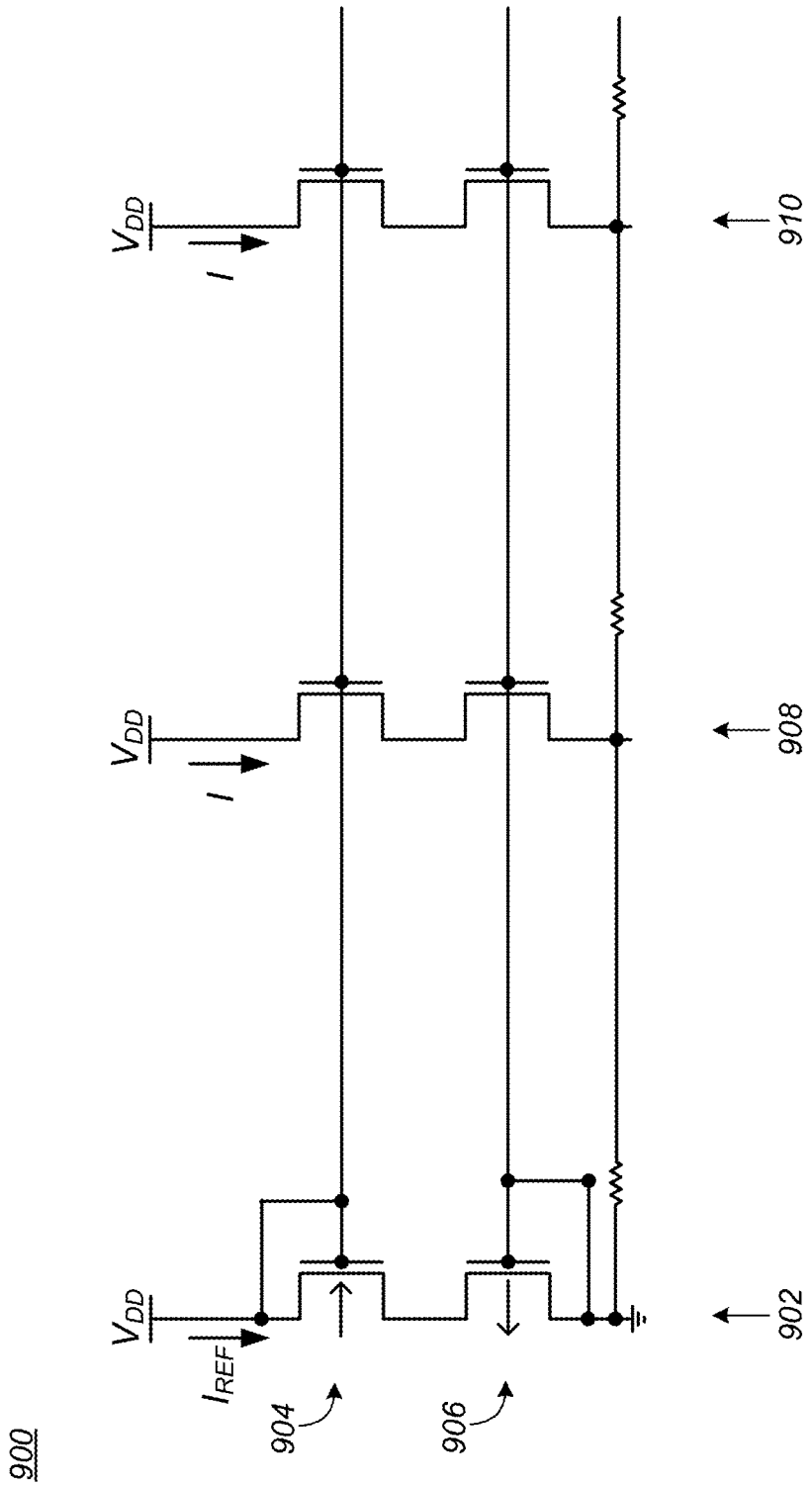
FIG. 9 is a schematic block diagram of a current mirror for a DAC according to an embodiment of the present disclosure.

It will be understood that because the driver circuit or driver in a monolithic integrated SLM typically includes a plurality of drive channels, up to 256 channels as noted above, the driver generally includes an array of DACs, each requiring two or more stable current sources. Thus, it is desirable that the drive circuit include one or more current mirrors insensitive to IR or voltage drop across the circuit to mirror a current through one active device by controlling the current in another active device of a circuit, providing a constant reference current ($I_{ref}$) to the DACs regardless of any voltage drops due to supply currents. One possible implementation of a current mirror for use with an array of internal DACs is a compound current mirror shown in FIG. 9. Referring to FIG. 9, the current mirror 900 generally includes in a reference leg 902 first and second active devices, shown here as an NMOS and PMOS FETs 904, 906, respectively in a diode configuration wherein the gate of the first device 904 is connected to the drain of the first device and the gate of the second device 906 is connected to the drain of the second device. The reference current, $I_{REF}$, is equal to the current through first and second devices 904, 906, which sets a reference voltage, which is the sum of the individual gate-to-source voltages ($V_{GS}$) of the first and second devices. Moreover, because the gates of first and second devices 904, 906, are coupled to the gates of active devices in other legs 908, 910, of the current mirror 910, the $V_{GS}$ of these devices is forced to be the same as that in the reference leg 902 with the result that the current in these legs is stable and equal to or mirrors $I_{REF}$. There is no current flowing on the gate wiring; therefore this reference voltage will be the same across the entire array of current mirrors. Further, variations in the drain voltage of the PMOS devices have only a small effect on the magnitude of the mirror currents, so the IR drop associated with long arrays of current mirrors and subsequent gradients in the mirrored currents is greatly mitigated.

Figure 10:
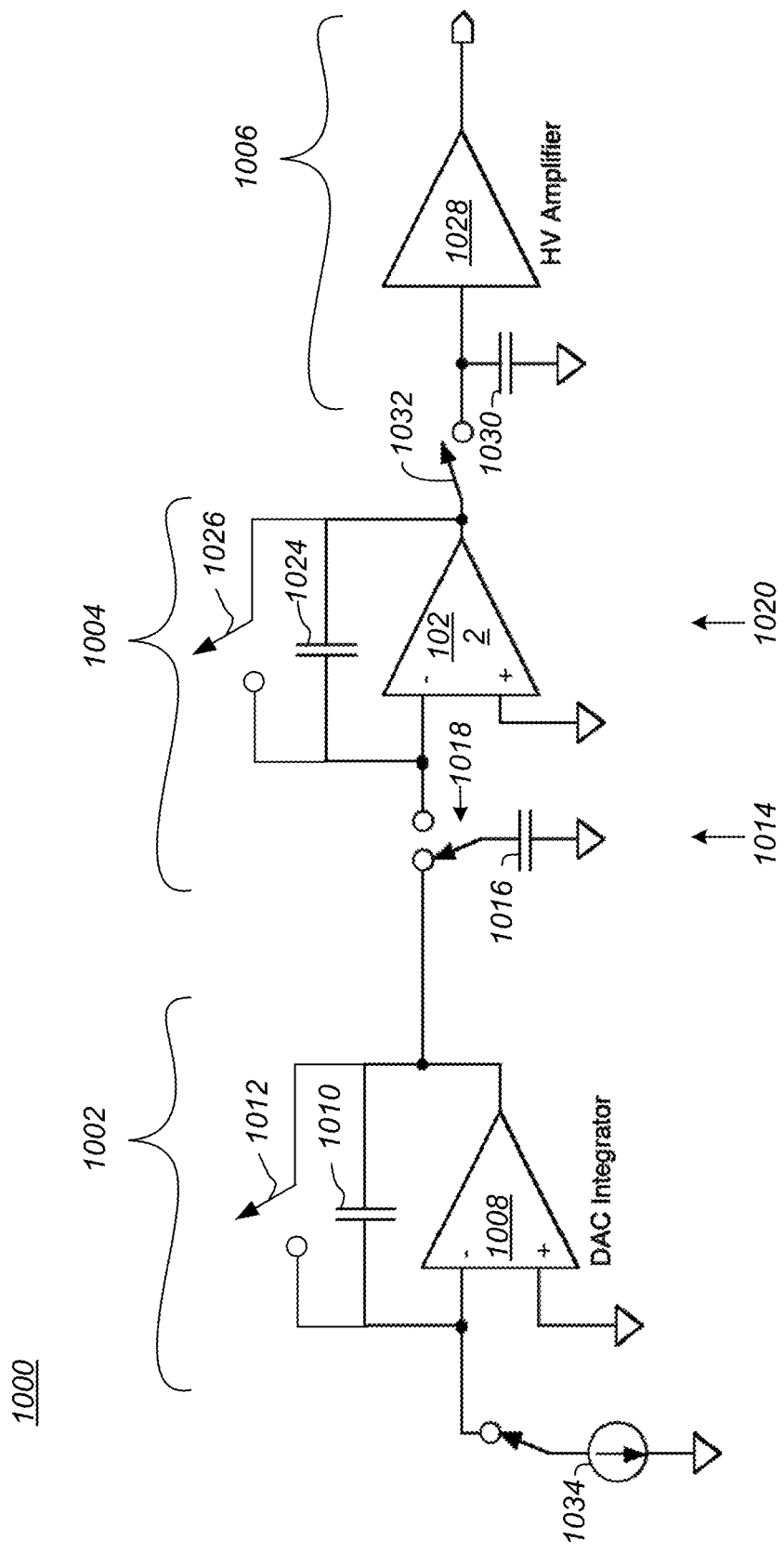
FIG. 10 is a schematic block diagram of a single drive channel of a driver for a monolithic integrated SLM including internal digital-to-analog converters (DACs) according to an embodiment of the present disclosure.

FIG. 10 is a schematic block diagram of a single drive channel of a driver including internal DACs according to another embodiment of the present disclosure to drive one or more actuators in a monolithic integrated SLM. The drive channel or driver 1000 includes at least a first internal (DAC 1002) coupled to sample-and-hold (S/H) stage 1004 including one or more S/H sub-circuits or sub-stages, and through the S/H stage to an high voltage output stage (HVO 1006) to drive one or more actuators in a monolithic integrated SLM (not shown in this figure).

In the embodiment shown, the DAC 1002 comprises a differential input, class A operational amplifier (Op-Amp 1008), an integrating capacitor 1010 coupled between a negative input and output terminal of the Op-Amp, and a reset switch 1012 in parallel with the integrating capacitor. Op-Amp 1008, as well as the other Op-Amps disclosed in these figures, is class A because varying supply currents would otherwise generate large amounts of supply noise through IR drops and rate of current change (di/dt) with wiring inductances and voltage regulator limited bandwidth.

The S/H stage 1004 comprises a first S/H sub-stage or sub-circuit 1014 including a first sampling capacitor 1016 and a switching element or circuit 1018 to switch the S/H stage between an output of the DAC 1002 and input to a second S/H sub-stage or sub-circuit 1020. The second S/H sub-stage 1020 comprises a second differential Op-Amp 1022, and a second sampling capacitor 1024 coupled between a negative input and output terminal of the Op-Amp. A reset switch 1026 in parallel with the second sampling capacitor 1024 completes the functional elements of the second S/H sub-stage 1020. It will be understood that the reset switch 1026 can be operated simultaneously with or independent of the reset switch 1012 in the DAC 1002 to reset the entire driver 1000.

The high voltage output stage (HVO 1006) can include one or more amplifier stages 1028, an HVO S/H capacitor 1030 and a second switching element or circuit 1032 through which the HVO is electrically coupled to the output of the S/H stage 1004. The HVO 1006 is described in detail below with reference to FIG. 22.

In operation a stable current source 1034 is coupled to the negative input of the Op-Amp 1008 for a period of time or pulse width determined by a digital input signal providing an output at the output terminal of the Op-Amp and allowing a charge or analog signal representative of a value of the digital input signal to build on the integrating capacitor 1010 and on the first sampling capacitor 1016. This analog signal is then coupled by the switching circuit 1018 of the S/H stage 1004 to the second differential Op-Amp 1022, then the HVO 1006 to drive one or more actuators in a monolithic integrated Spatial Light Modulator or GLV™.

Figure 11:
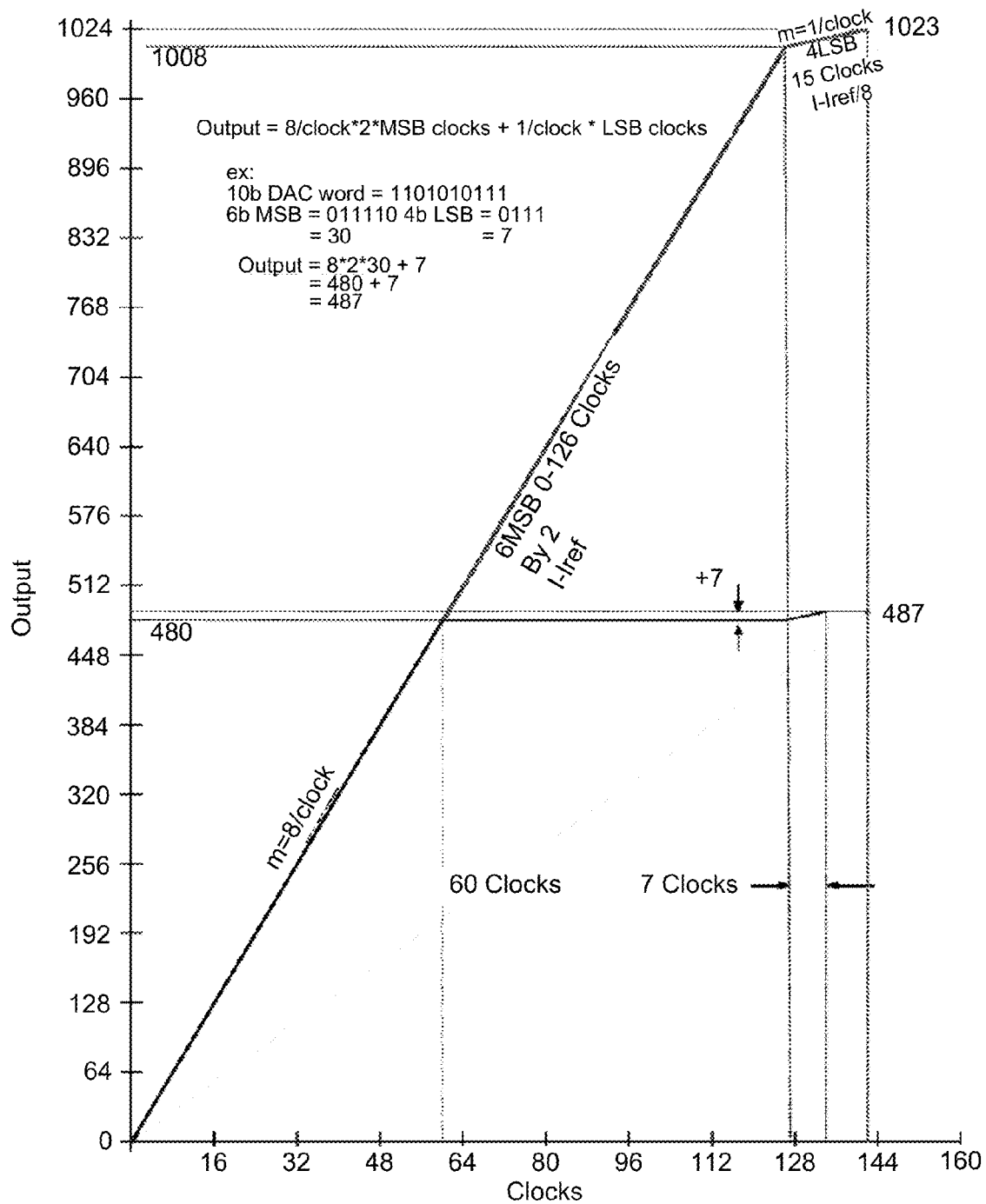
FIG. 11 is a graph of DAC output over time and illustrates the improved resolution achieved with internal DACs according to an embodiment of the present disclosure.

FIG. 11 is a graph of DAC output over time and illustrates the improved resolution achieved with internal DACs according to one embodiment of the present disclosure. Referring to FIG. 11, it is noted that the DAC uses a multi-slope architecture that allows operation with reduced clock rate, capable of achieving resolution of 10b (bits) digital-to-analog-conversion into 6b and/or 4b segments in less than 200 clock cycles. In addition, the multi-slope architecture can be monotonic, and increasing or decreasing by a constant amount depending on the implementation of the DAC. A multi-slope architecture is preferred as it will reduce the number of clock cycles required for the digital-to-analog-conversion.

Figure 12:
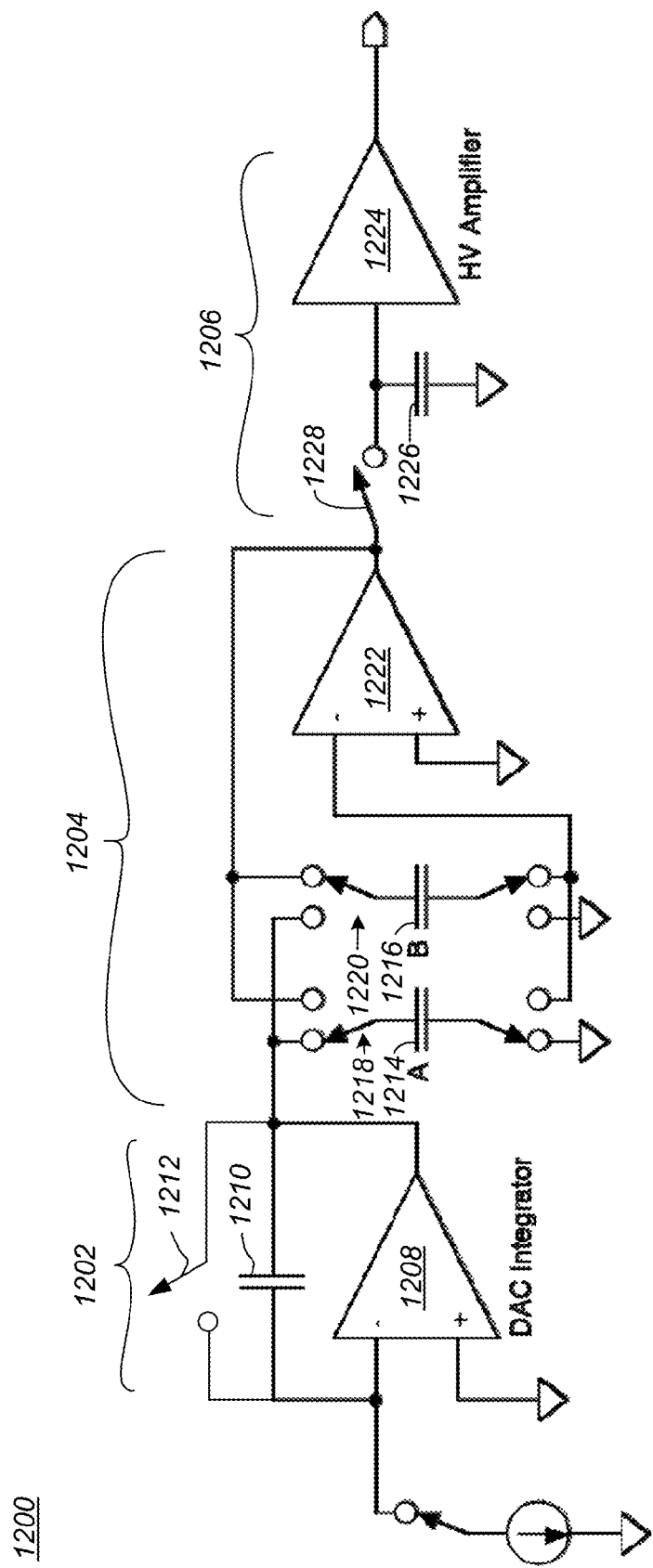
FIG. 12 is a schematic block diagram of a single drive channel of a driver for a monolithic integrated SLM having a double sample and hold architecture and including internal DACs according to an embodiment of the present disclosure.

Another embodiment of a single drive channel of a driver for a monolithic integrated SLM having a double sample and hold architecture and including internal DACs according to the present disclosure is shown in FIG. 12. The drive channel or driver 1200 includes at least a first internal (DAC 1202) coupled to a dual or double S/H stage 1204, and through the double S/H stage to a HVO stage 1206.

Referring to FIG. 12, the DAC 1202 comprises a differential Op-Amp 1208, an integrating capacitor 1210 coupled between a negative input and output terminal of the Op-Amp, and a reset switch 1212 in parallel with the integrating capacitor.

The double S/H stage 1204 comprises first and second capacitors, capacitor A 1214 and capacitor B 1216, first and second switching circuits 1218, 1220, and a second differential Op-Amp 1222.

The high voltage output stage (HVO 1206) can include one or more amplifier stages 1224, an HVO S/H capacitor 1226 and a second switching element or circuit 1228 through which the HVO is electrically coupled to the output of the S/H stage 1204.

Figure 13:
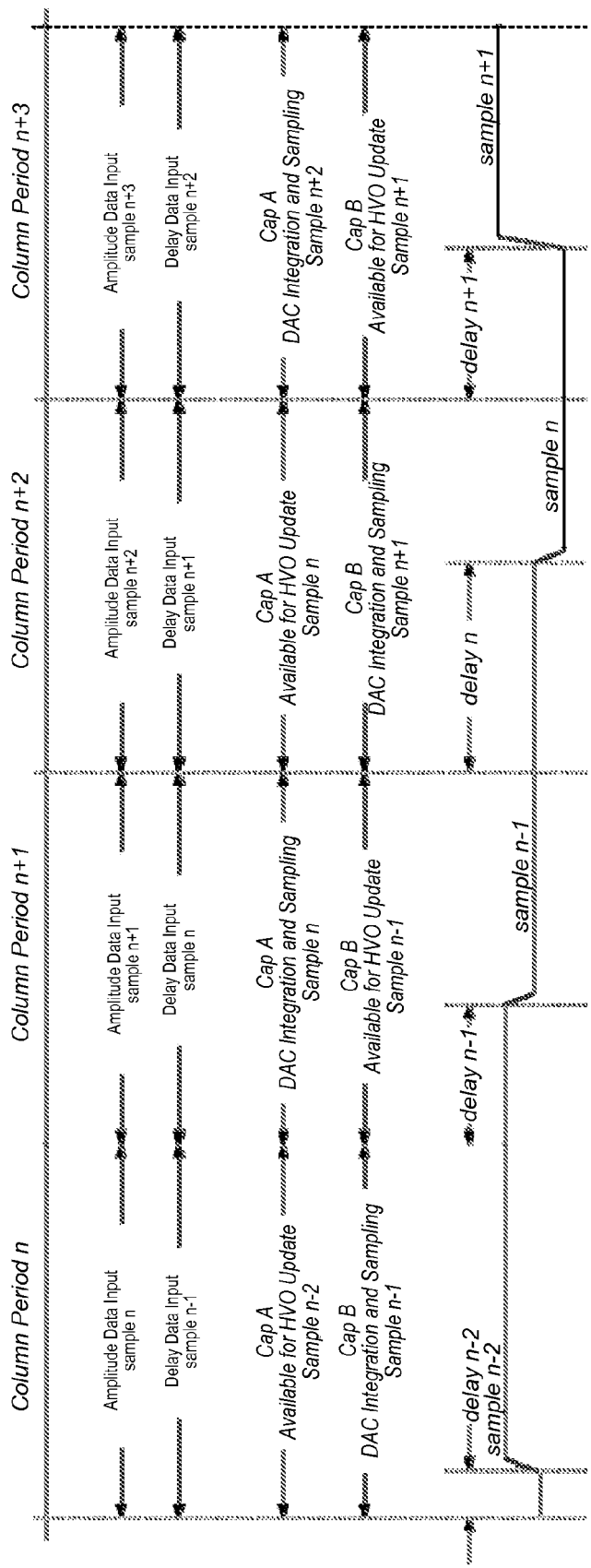
FIG. 13 is a timing sequence for a drive channel having a double sample and hold architecture.
Figure 14:
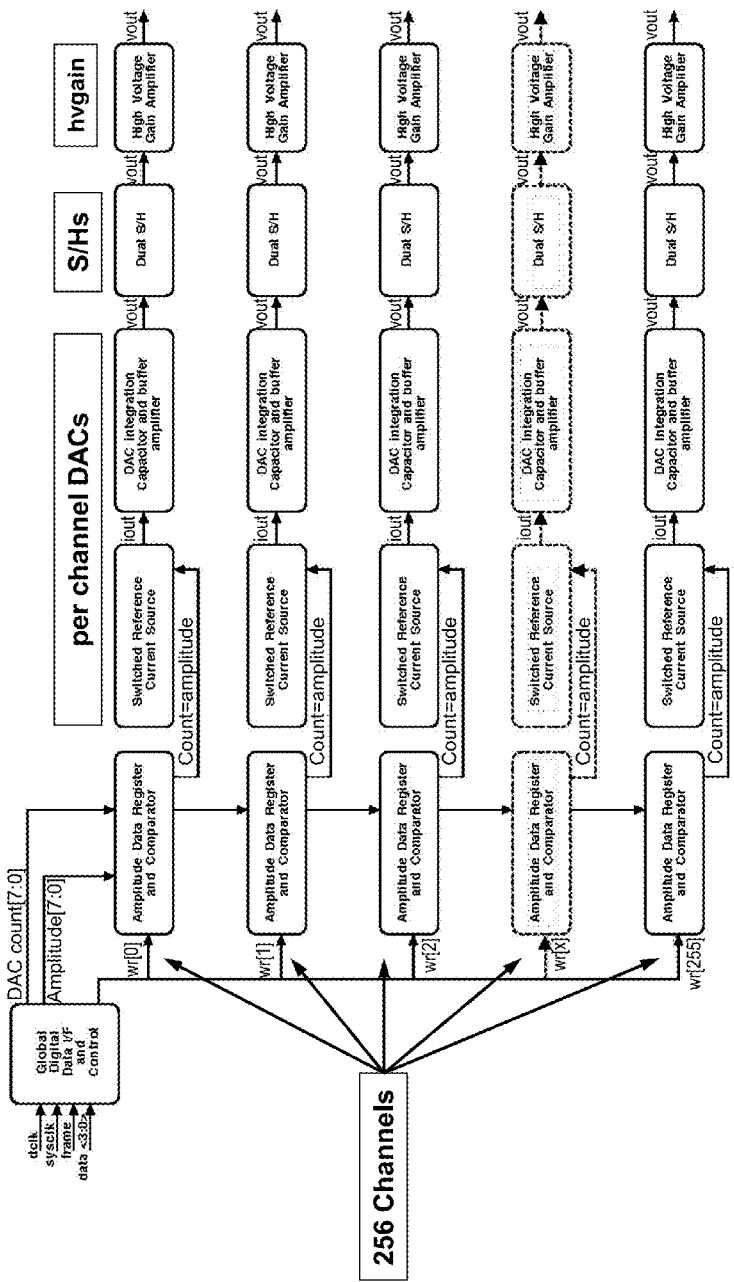
FIG. 14 is a schematic block diagram of a configuration of a driver for a monolithic integrated SLM having a double sample and hold architecture and without use of pulse width modulation (PWM) according to an embodiment of the present disclosure.
Figure 15:
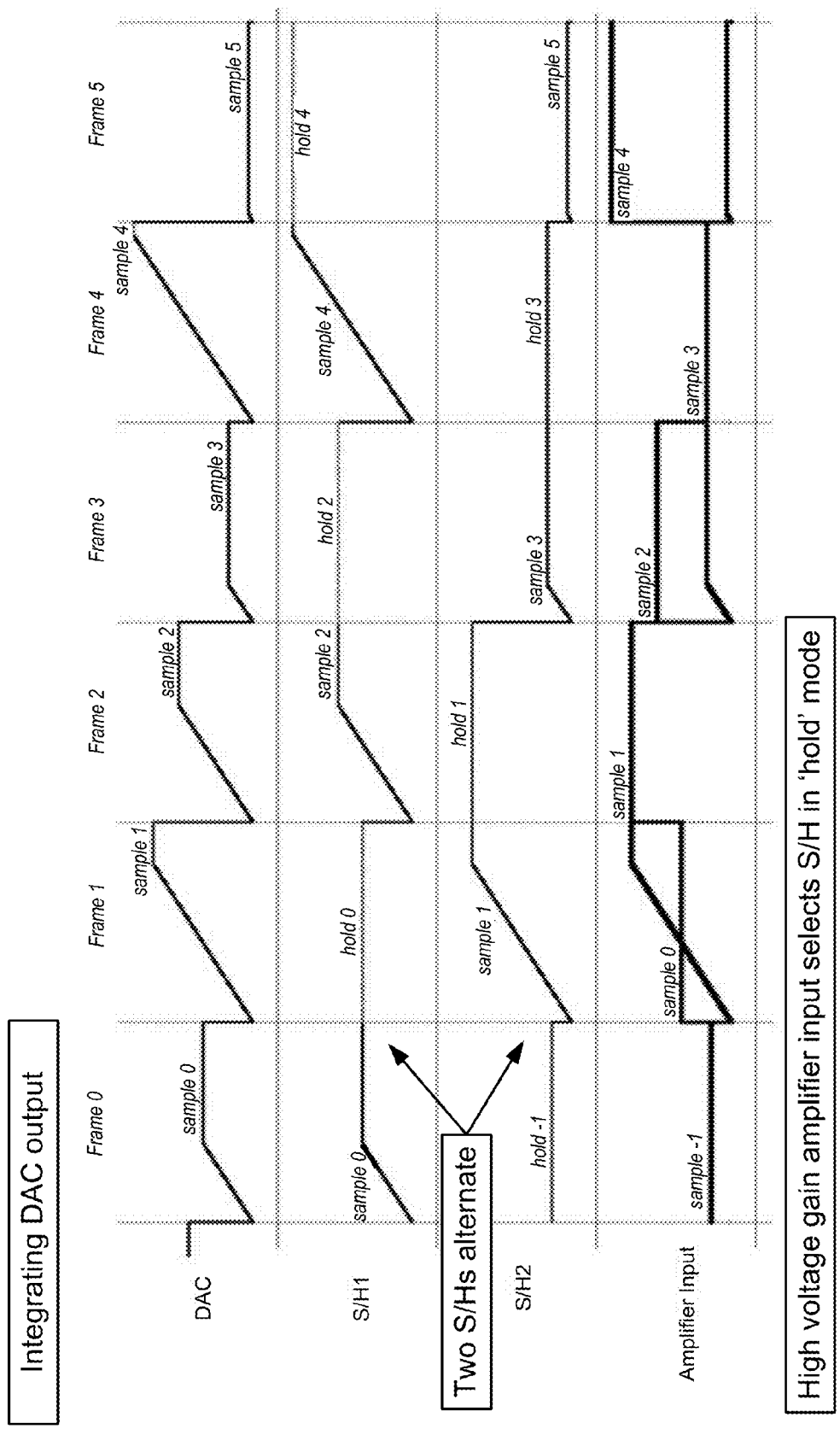
FIG. 15 is a timing diagram illustrating DAC output, sample and hold (S/H) output and amplifier input for a drive channel of a driver for a monolithic integrated SLM having a double sample and hold architecture and without use of PWM.

A timing sequence for a drive channel having a double S/H architecture is shown in FIG. 13. A schematic block diagram of a configuration of a driver for a monolithic integrated SLM having a double sample and hold architecture and without use of pulse width modulation (PWM) is shown in FIG. 14. A timing diagram illustrating DAC output, sample and hold (S/H) output and amplifier input for a drive channel of a driver for a monolithic integrated SLM having a double sample and hold architecture and without use of PWM is shown in FIG. 15. Referring to FIGS. 12-15 it is seen that alternating the S/H capacitors, capacitor A 1214 and capacitor B 1216 substantially eliminates unusable delay associated with accumulating charge on the capacitors. In addition, because the Op-Amp 1208 does not need to quickly charge the capacitors 1214 and 1216 there is a significant reduction in power consumed. This is because otherwise a bias current of the Op-Amp 1208 must be high enough to supply charging currents to quickly charge the capacitors 1214 and 1216.

Figure 16:
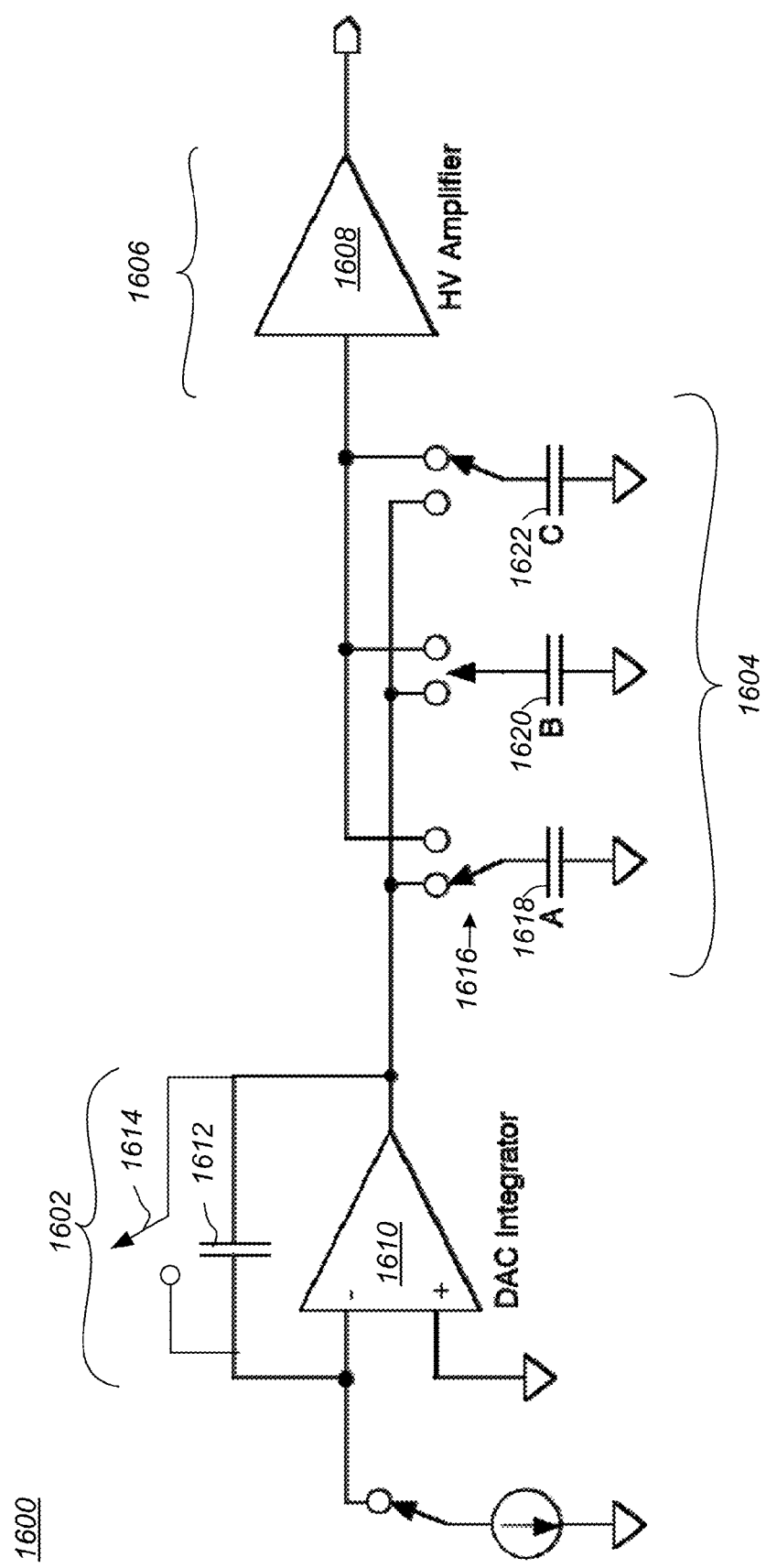
FIG. 16 is a schematic block diagram of a single drive channel of a driver for a monolithic integrated SLM having a triple sample and hold architecture and including internal DACs according to an embodiment of the present disclosure.

In another embodiment, shown in FIG. 16, each drive channel of a driver for a monolithic integrated SLM comprises internal DACs and a triple sample and hold (S/H) architecture. Referring to FIG. 16, the drive channel or driver 1600 includes at least a first internal (DAC 1602) coupled to a triple S/H stage 1604, and through the S/H stage to a HVO stage 1606 consisting, in this embodiment, of substantially only a HV amplifier 1608. As in the embodiments described above, the internal DAC 1602 comprises differential operational amplifier (Op-Amp 1610), an integrating capacitor 1612 coupled between a negative input and output terminal of the Op-Amp, and a reset switch 1614 in parallel with the integrating capacitor.

The triple S/H stage 1604 comprises a switching element or circuit 1616 to switch the S/H stage between an output of the DAC 1602 and input to the HV amplifier 1608 and first, second and third capacitors 1618, 1620, 1622. The embodiment of FIG. 16 eliminates the second Op-Amp of the S/H stage 1604, although the S/H stage may further include a small buffer amplifier at each capacitor 1618, 1620, 1622 to drive the switch 1616 and HVO input capacitance, resulting in lower power losses.

Figure 17:
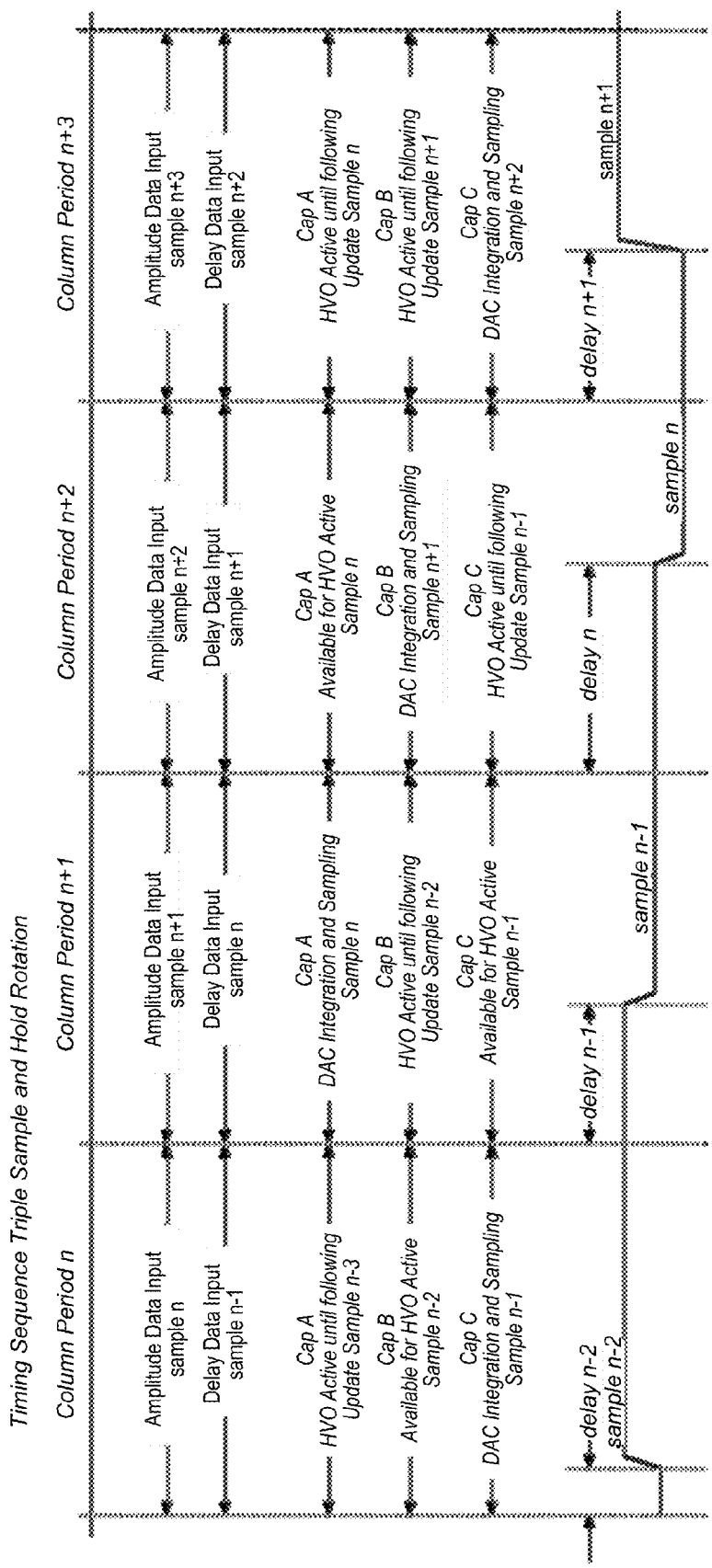
FIG. 17 is a timing sequence for a drive channel having a triple sample and hold architecture.
Figure 18:
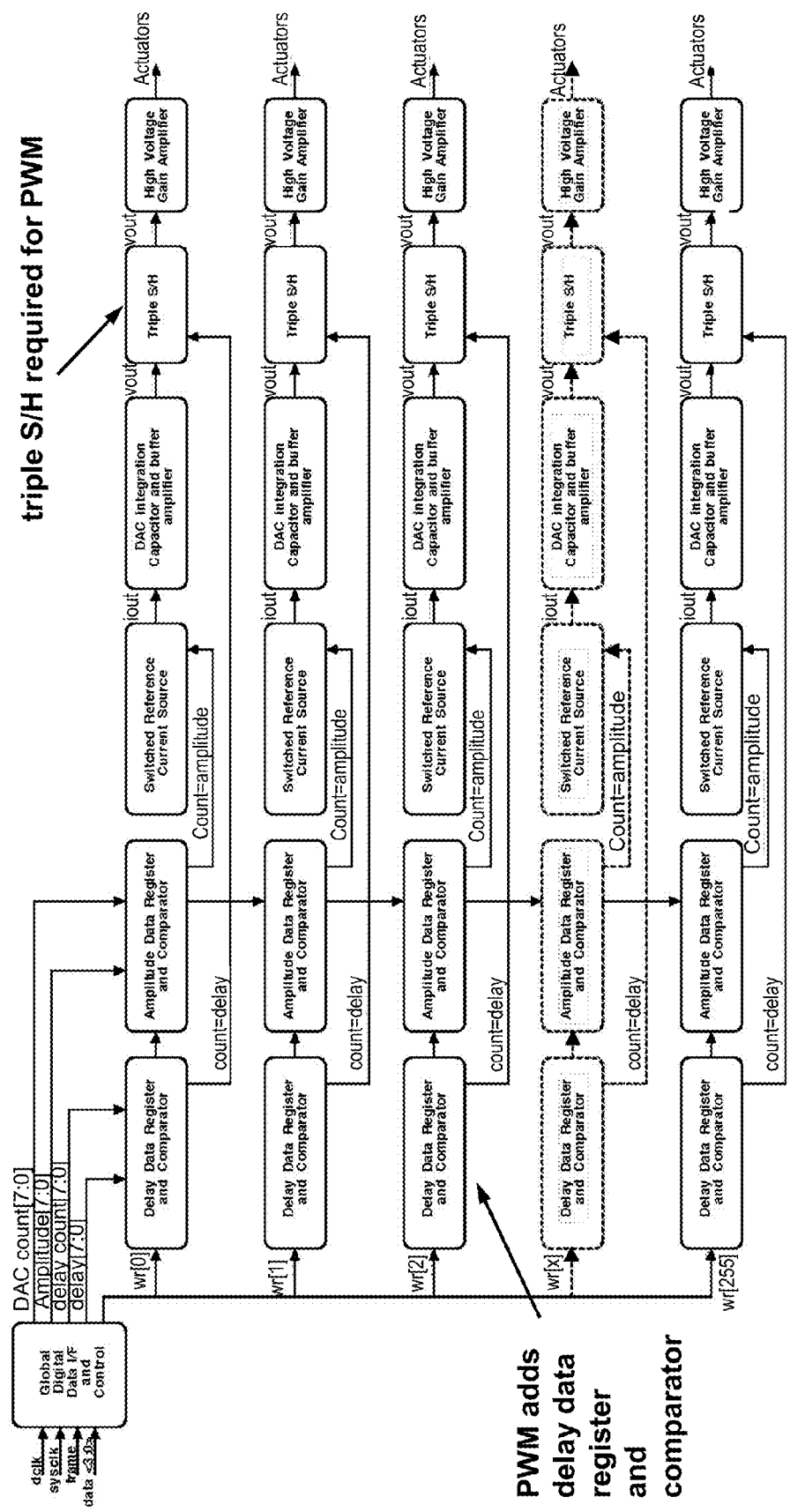
FIG. 18 is a schematic block diagram of a configuration of a driver for a monolithic integrated SLM having a triple sample and hold architecture and using PWM according to an embodiment of the present disclosure.
Figure 19:
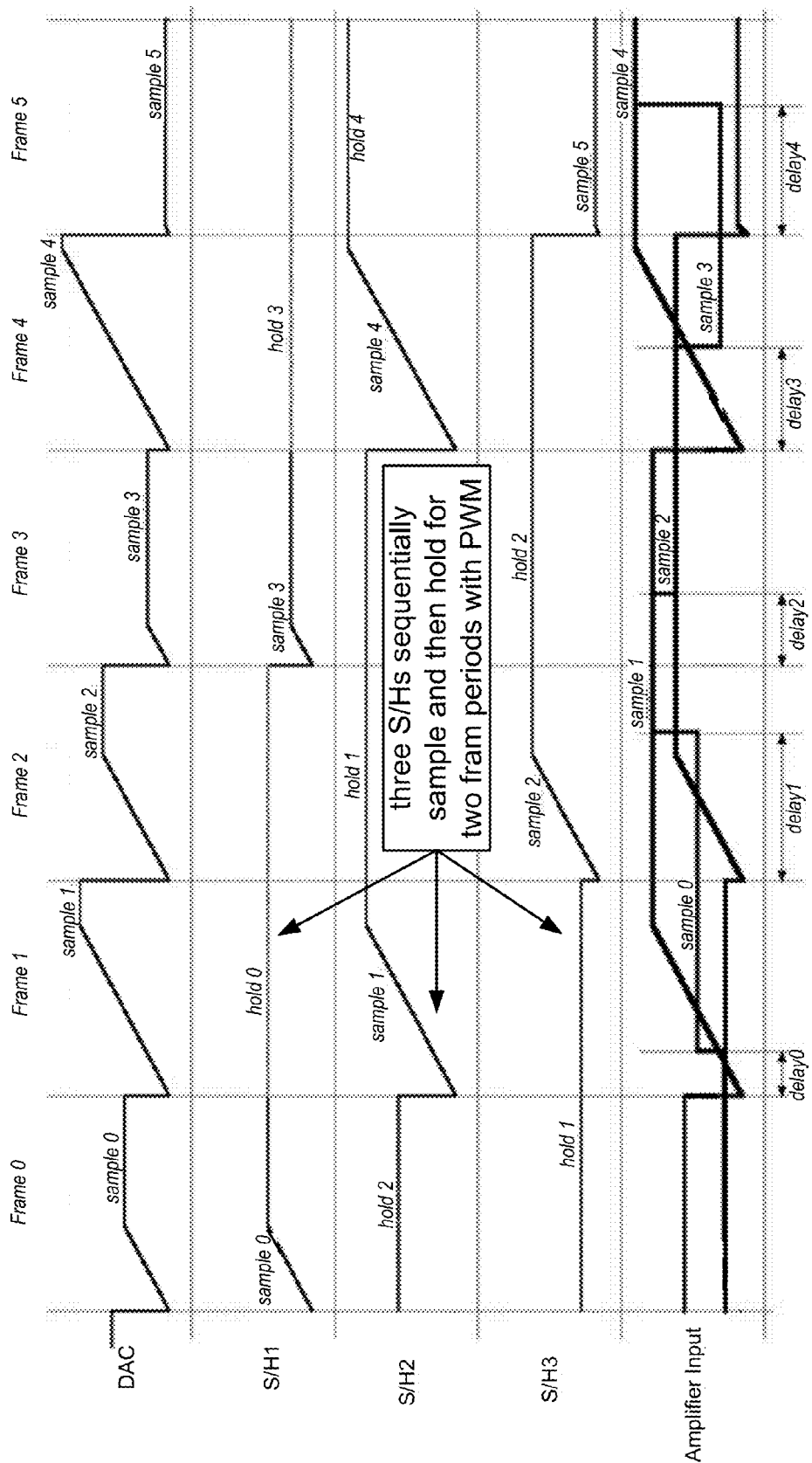
FIG. 19 is a timing diagram illustrating DAC output, S/H output and amplifier input for a drive channel of a driver for a monolithic integrated SLM having a triple sample and hold architecture and using PWM according to an embodiment of the present disclosure.

A timing sequence for a drive channel having a triple S/H architecture is shown in FIG. 17. A schematic block diagram of a configuration of a driver for a monolithic integrated SLM having a triple sample and hold architecture and using PWM is shown in FIG. 18. A timing diagram illustrating DAC output, S/H output and amplifier input for a drive channel of a driver for a monolithic integrated SLM having a triple sample and hold architecture and using PWM is shown in FIG. 19. Referring to FIGS. 16-19 it is seen that because the first, second and third capacitors 1618, 1620, 1622, sequentially sample and then hold the accumulated charge or analog signal for two frame periods, the embodiment of FIG. 16 substantially eliminates unusable delay associated with accumulating charge on the S/H capacitors, reduces power consumption by eliminating the need to quickly charge the capacitors 1618, 1620, 1622, and because of the elimination of the second Op-Amp in the S/H stage 1604 and a S/H capacitor in the HVO 1606, a further reduction in power consumption is achieved.

Figure 20:
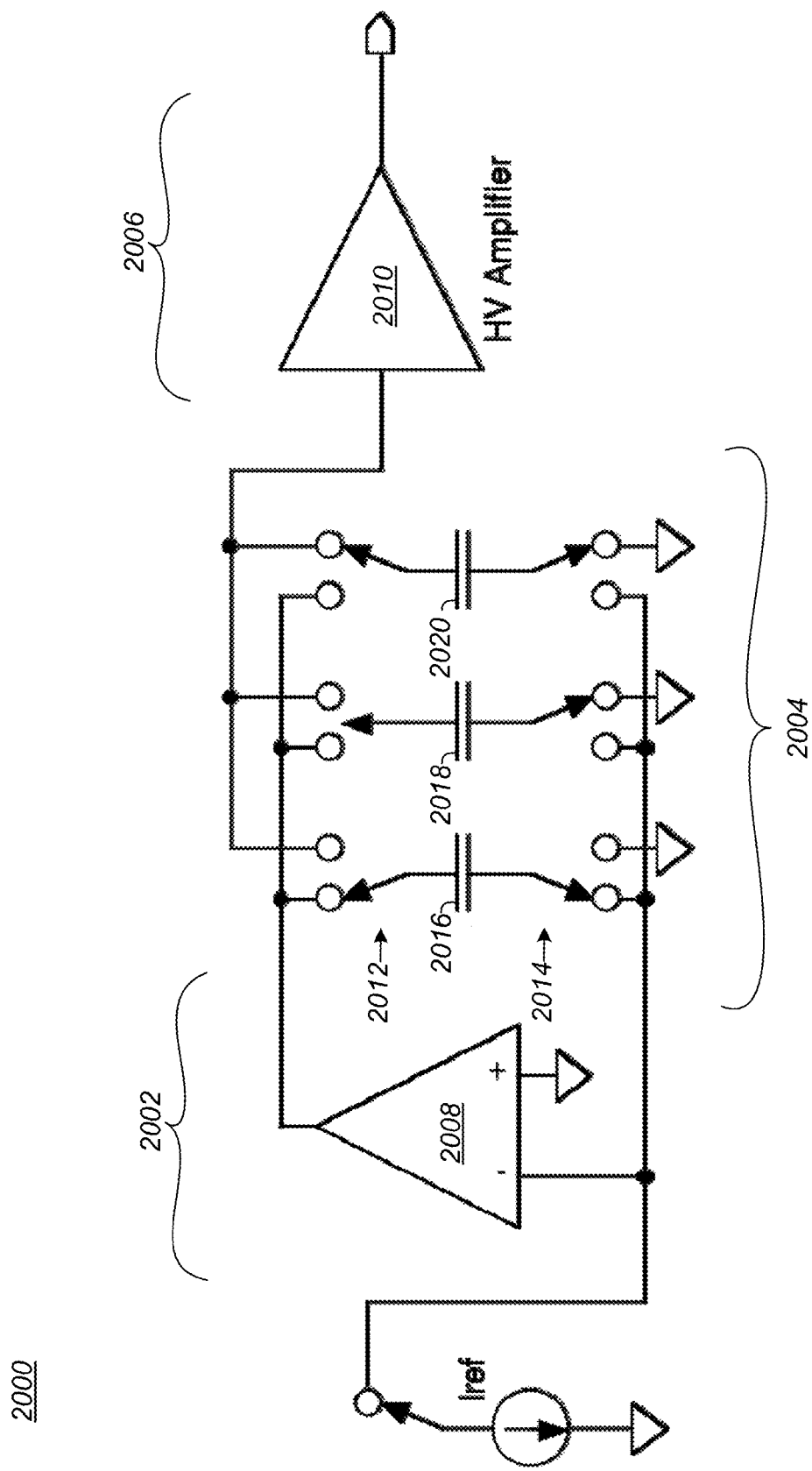
FIG. 20 is a schematic block diagram of a single drive channel of a driver for a monolithic integrated SLM having a triple sample and hold architecture and including internal DACs according to another embodiment of the present disclosure.

FIG. 20 is a schematic block diagram of a single drive channel of a driver for a monolithic integrated SLM having a triple sample and hold architecture and including internal DACs according to another embodiment of the present disclosure. Referring to FIG. 20, the drive channel or driver 2000 includes at least a first internal (DAC 2002) coupled to a triple S/H stage 2004, and through the S/H stage to a HVO stage 2006 to drive one or more actuators in a monolithic integrated SLM.

In this embodiment, both the DAC 2002 and the HVO 2006 consist of substantially only a differential Op-Amp, 2008 and 2010, respectively.

The triple S/H stage 2004 comprises a first and second switching circuits 2012, 2014, to switch the S/H stage between an output of the DAC 2002 and input to the HV amplifier 2010 and first, second and third capacitors 2016, 2018, 2020. Because the first, second and third capacitors 2016, 2018, 2020, sequentially sample and then hold the accumulated charge or analog signal for two frame periods, the embodiment of FIG. 20 substantially eliminates unusable delay associated with accumulating charge on the S/H capacitors. Moreover, because of the elimination of an Op-Amp in the S/H stage and an S/H capacitor in the HVO 2006, a substantial reduction in power consumption is achieved. The embodiment of FIG. 20 eliminates the DAC 2002 integration capacitor, thus matching of capacitors 2016, 2018, 2020, becomes important as DAC gain will vary with capacitor value.

Figure 21:
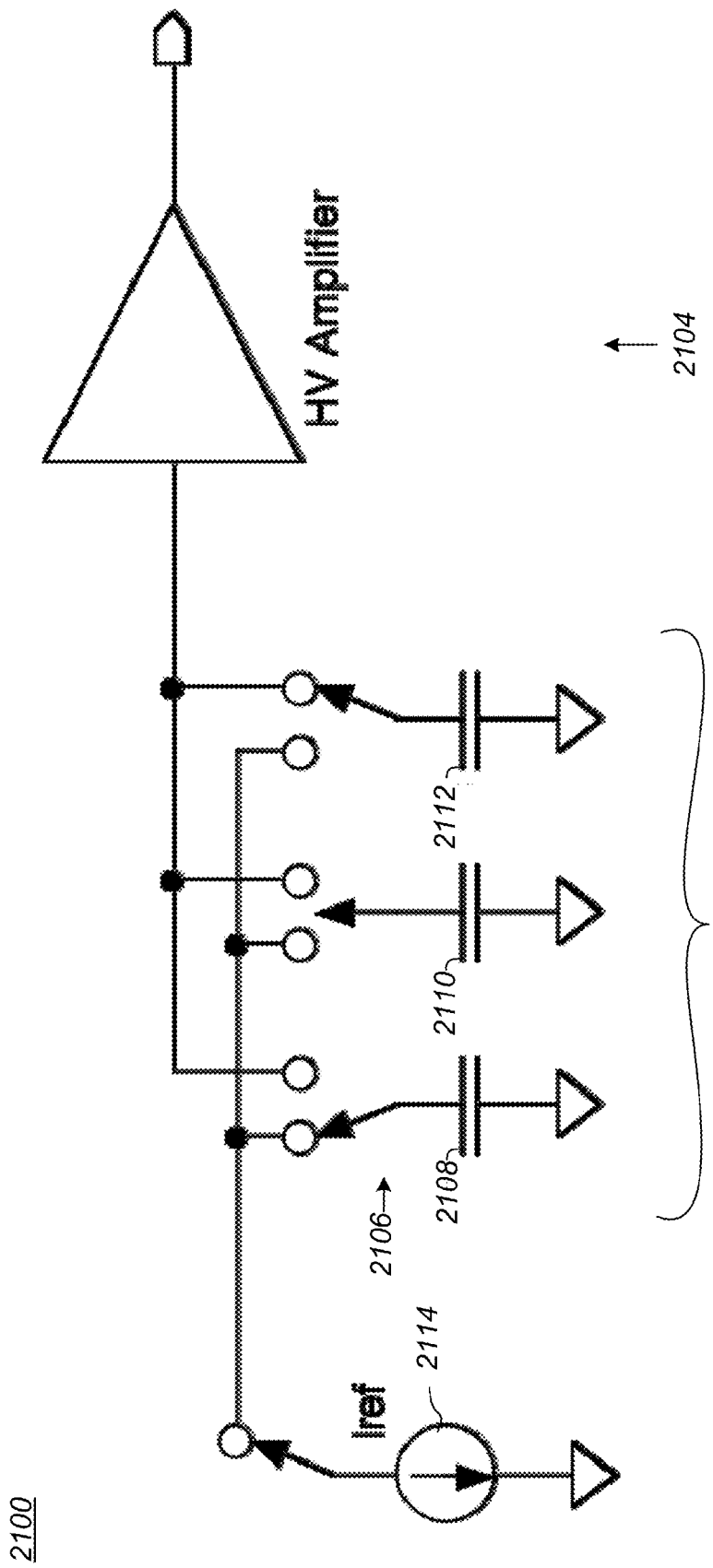
FIG. 21 is a schematic block diagram of a single drive channel of a driver for a monolithic integrated SLM having a triple sample and hold architecture and including internal DACs according to yet another embodiment of the present disclosure.

FIG. 21 is a schematic block diagram of yet another embodiment of a single drive channel of a driver having a triple sample and hold architecture and not including an internal DAC. Referring to FIG. 21, the drive channel or driver 2100 includes a triple S/H stage 2102 coupled to a HV amplifier 2104 to drive one or more actuators in a monolithic integrated SLM. The triple S/H stage 2102 comprises a switching element or circuit 2106 and first, second and third capacitors 2108, 2110, 2112. In operation a stable current source 2114 is coupled to the capacitors of the triple S/H stage 2102 for a fixed period of time determined by a digital input signal allowing a charge or analog signal representative of a value of the digital input signal to build on the sampling capacitors 2108, 2110, 2112. Because the first, second and third capacitors 2108, 2110, 2112, sequentially sample and then hold the accumulated charge or analog signal for two frame periods, the embodiment of FIG. 21 substantially eliminates any reduction of the duty cycle or unusable delay associated with accumulating charge on the S/H capacitors. Moreover, because of the elimination of an Op-Amp in the S/H stage 2102 and an S/H capacitor in the HVO 2104, a substantial reduction in power consumption is achieved.

Figure 22:
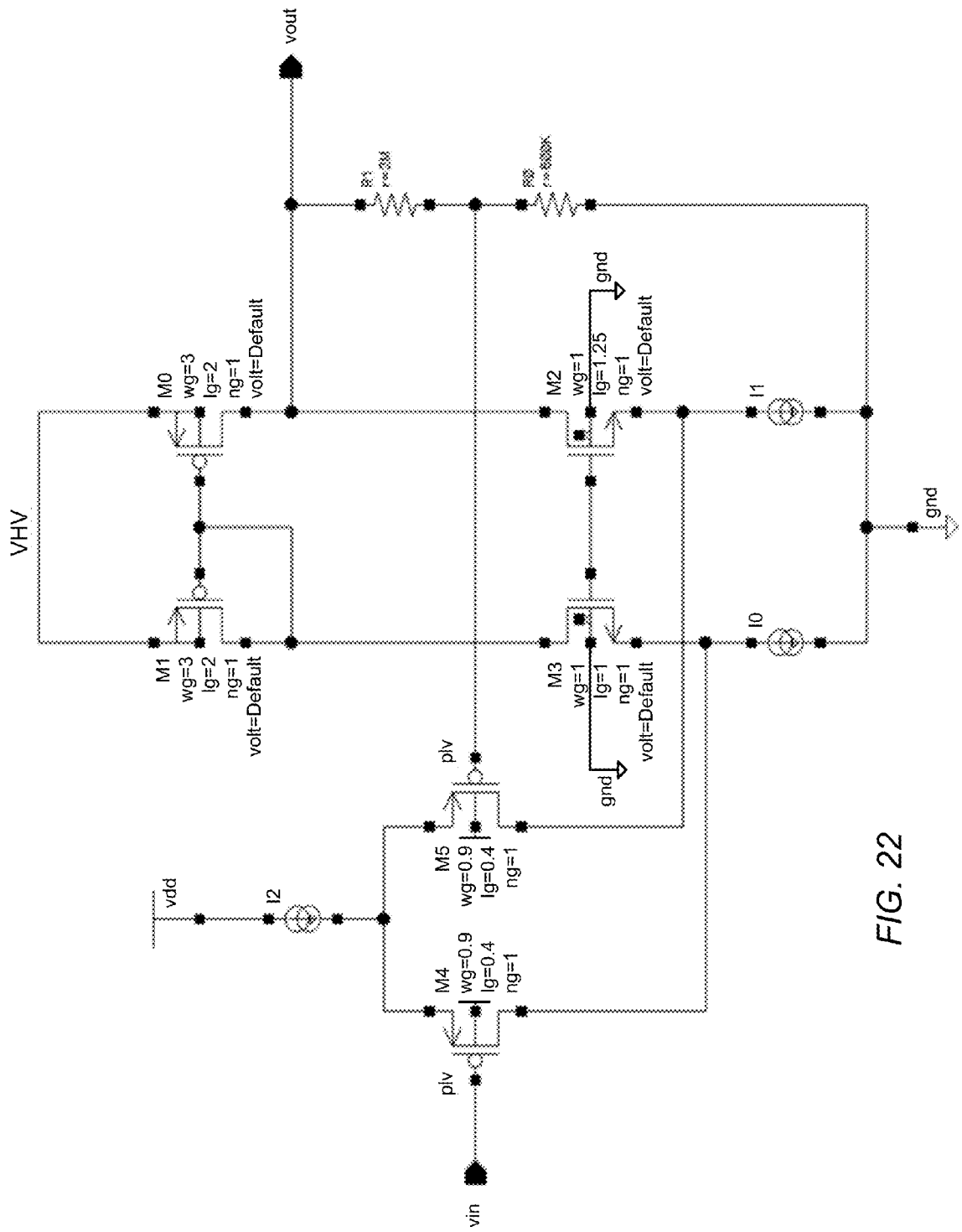
FIG. 22 is a schematic block diagram of a high voltage gain amplifier suitable for use with a monolithic integrated SLM according to an embodiment of the present disclosure.

An embodiment of a HV amplifier suitable for use with a monolithic integrated SLM according to an embodiment of the present disclosure will now be described with reference to FIG. 22. Previous HV amplifiers used to drive actuator type SLM used an open loop design or architecture with passive load resistors. The amplifier bandwidth was set by the load resistance, and total load capacitance included both wiring and the actuators. In contrast, the embodiment shown in FIG. 22 is a closed loop design in which the resistive feedback provided by R1 and R0 stabilizes the gain, and references the output to ground instead of VHV further stabilizing the output. In addition, the small signal bandwidth is given by the following:

$$\omega = gm/C\text{load}$$

where gm>100 μmho, while 1/Rout=2 μmho.
instead of:

$$\omega = 1/(R\text{out}*C\text{load})$$

Thus, enabling the bandwidth of an HV amplifier with a closed loop design, such as shown in FIG. 22, to much greater than with open loop designs. Although the HV amplifier has been shown and described with reference to the specific embodiment shown in FIG. 22, it will be understood that monolithic integrated Spatial Light Modulator of the present disclosure is not limited to this particular embodiment and may be implemented using other HV amplifiers with closed loop designs without departing from the spirit and scope of the present invention.

Testability

In another aspect the present invention is directed to test circuitry and a method for electrically testing a monolithic integrated SLM at the wafer of die level. Previously, testing was done optically, after packaging resulting in the fabrication and electrical testing at the wafer level, if done at all, was only possible by manually probing the finished circuit. This difficulty or inability to test at the wafer or die level results in the packaging of many defective devices increasing production time and costs. The ability to make accurate electrical measurements of the analog output from the driver will enable far easier and accurate characterization of the device electrical performance.

Figure 23A:
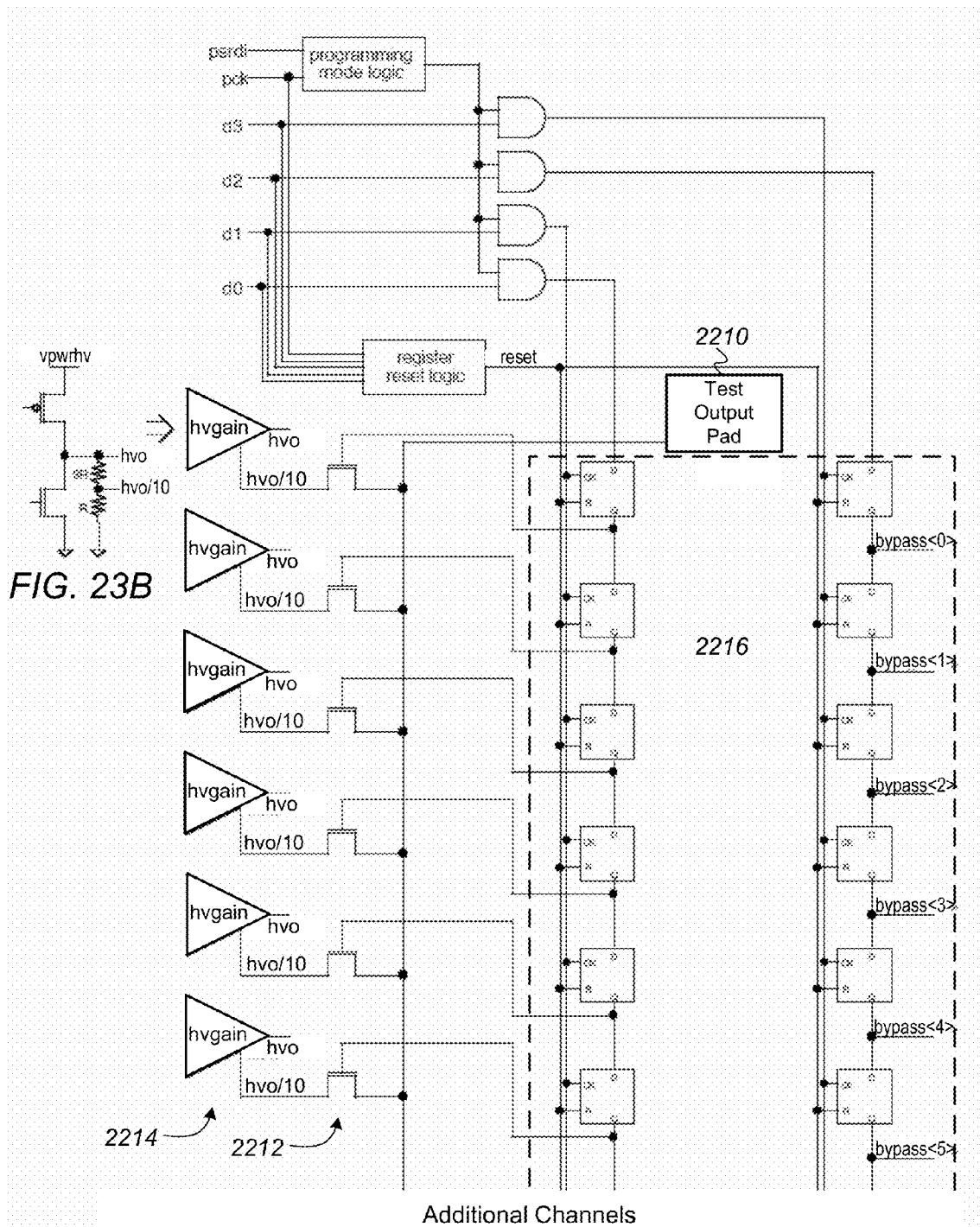

A schematic block diagram of a driver for a monolithic integrated SLM and including test circuitry according to an embodiment of the present disclosure is shown in FIGS. 23A and 23B. Referring to FIG. 23A, each block of 256 drivers is designed to be totally independent of each other. Each block contains all of the bond pads required for full operation. A dedicated test output pad 2310 is included that is not bonded out.

The test circuitry, from the analog standpoint, will consist of 256 MOS switches 2312 forming a 1-of-256 multiplexor (MUX). Each switch would connect to the output of a channel driver 2314, or more precisely, an attenuated output, to the test output pad 2310. In the embodiment shown, the output of the channel drivers to the test output pad 2310 are attenuated to a value of one tenth of HVO by the resistive voltage divider of FIG. 23B.

An attenuated output is chosen because this makes the design much easier. This allows the use of devices with a maximum voltage that is lower than the signal amplitude being tested for the MUX switches. It is then also easier to keep the gate drive voltages within limits. Although this introduces a small amount of potential error from resistor mismatch into the measurement, it is small compared to the design difficulty of a direct connection that would require high voltage CMOS switches and more complex gate drive circuitry. In addition, the MUX switch capacitance will have a lesser effect on the output settling.

The MOS switches 2312 are operated by a 256-bit long shift register 2316. Setting of the MOS switches 2312 is done by programming a single '1' into the shift register. The switch corresponding to the register programmed to '1' will be turned on.

Since the output resistance of the HV amplifier is high, at >100 KΩ, the output settling is very sensitive to capacitive loading, and the output DC error very dependent on any resistive loading. The output settling time will be much slower at the test output because the loading capacitance will be perhaps 50× higher. While testing, this must be taken into account. Also, it would be advisable to provide a buffer amplifier on the probe card to minimize loading from the cable capacitance.

The signals for programming the register use pins shared with the other normal functions. The circuit must be placed into test programming mode, after which the pins may be used to program the register.

Figure 24:
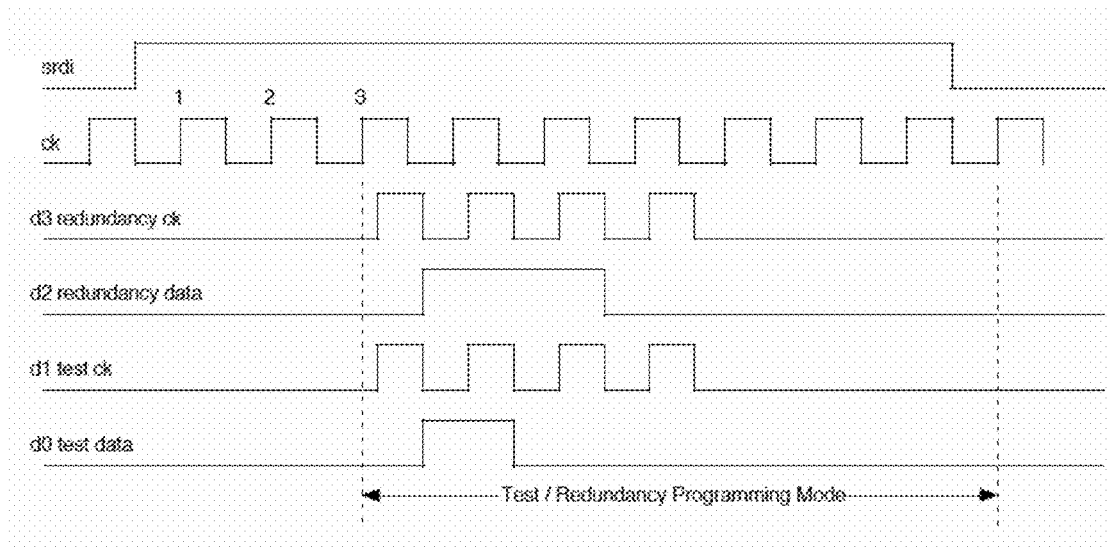
FIG. 24 is a timing diagram illustrating signals to the driver and test circuitry of FIG. 23A during test programming mode according to an embodiment of the present disclosure.

A timing diagram illustrating signals to the driver and test circuitry of FIG. 23A during test programming mode according to an embodiment of the present disclosure is shown in FIG. 24. Referring to FIG. 24, test programming mode is entered by holding srdi (shift register data input) HIGH. After 3 clock periods, the device will remain in programming mode until srdi is brought LOW. In programming mode, the delay data input bus pins are redirected to the shift registers for both test and redundancy programming. The d0 pin becomes the test data input and d1 the test shift clock input. Normally, d0 will be high for one clock period, and d1 clocked for the appropriate number of clocks to turn on the desired switch. To sequentially scan the channels, it would be possible to enter programming mode, shift a '1' to the first position, exit programming mode and perform any testing, then reenter test mode and merely clock once to shift to the next channel, and exiting programming mode. This may be repeated until the last channel is selected.

Figure 25:
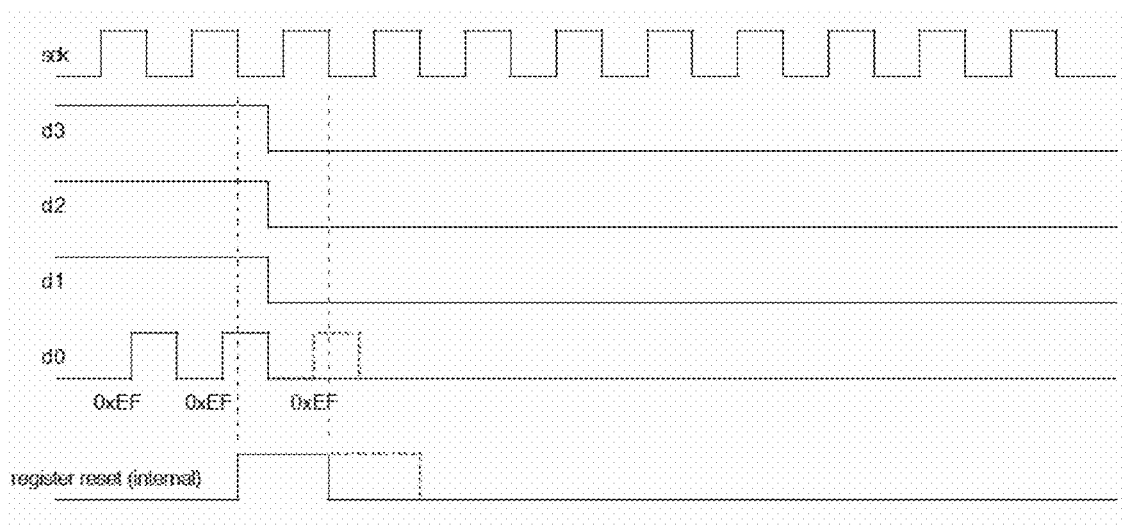
FIG. 25 is a timing diagram illustrating signals to the driver and test circuitry of FIG. 23A during test mode according to an embodiment of the present disclosure.

A timing diagram illustrating signals to the driver and test circuitry of FIG. 23A during test mode according to an embodiment of the present disclosure is shown in FIG. 25. Referring to FIG. 25, the test and redundancy programming registers may be globally reset under normal operation by programming the unused digital delay value to 0xEF at least twice. Reset will be continuously asserted as long as 0xEF is programmed. The initial testing sequence would be to first sequentially test all channels. This may be done by:
1. Reset all registers
2. Hold d0-d3 LOW
3. Enter programming mode by holding srdi HIGH
4. Wait at least 3 clock periods
5. Set d0
6. Clock d1 once
7. Clear d0
5. Exit programming mode by setting srdi LOW
6. Test 0th channel
7. Reenter programming mode
8. Clock d0 once
9. Exit programming mode
10. Test 1st channel
11. Repeat until all channels tested The circuit will operate normally with the test MUX enabled. For observation of the output waveforms, the clocks and all digital signals should be scaled down in frequency so that the output waveform update delays can be accurately measured.

Redundancy

In another aspect the present invention is directed to circuitry for providing one or more redundant drivers in each block of drivers. Previously, a single bad driver anywhere out of the total of as many as 8192 drivers could cause the rejection of the entire die. With redundancy any defective driver in the block of 256 drivers could be replaced by the spare driver. The default condition after reset is for redundancy to be disabled. This ensures that the device is usable in all legacy applications without having to make major changes to the firmware.

Figure 26:
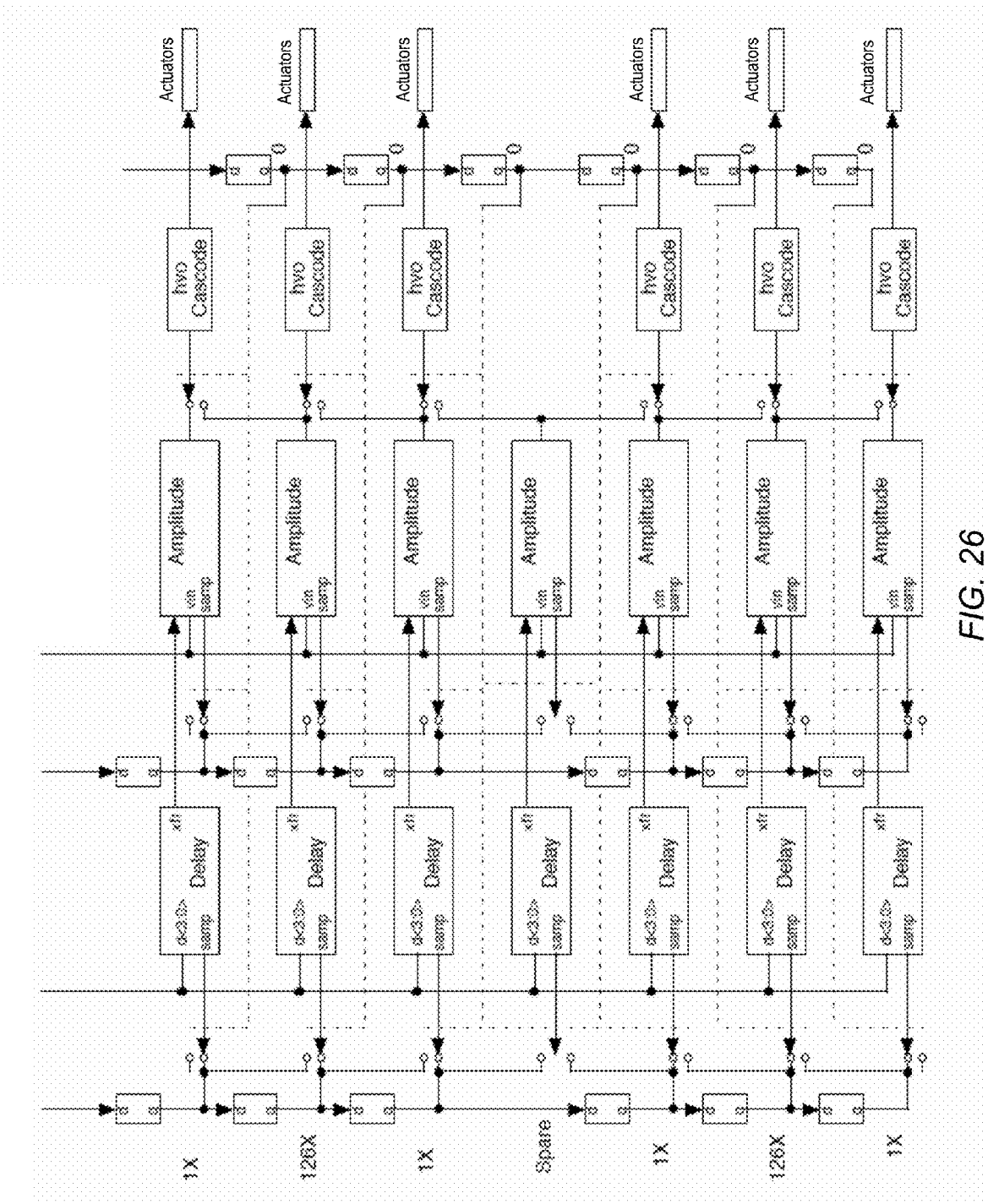
FIG. 26 is a schematic block diagram illustrating replacement of a single defective drive channel in a driver for a monolithic integrated SLM with a spare drive channel in the middle of an array of drive channels according to an embodiment of the present disclosure.

FIG. 26 is a schematic block diagram illustrating replacement of a single defective drive channel in a driver for a monolithic integrated SLM with a spare drive channel in the middle of an array of drive channels according to an embodiment of the present disclosure. Referring to FIG. 26, the spare driver is placed in the center of the array. If there is a bad driver, the adjacent driver between it and the spare is switched in to replace it. In turn, each adjoining driver replaces the next channel until the spare is switched in.

Figure 27:
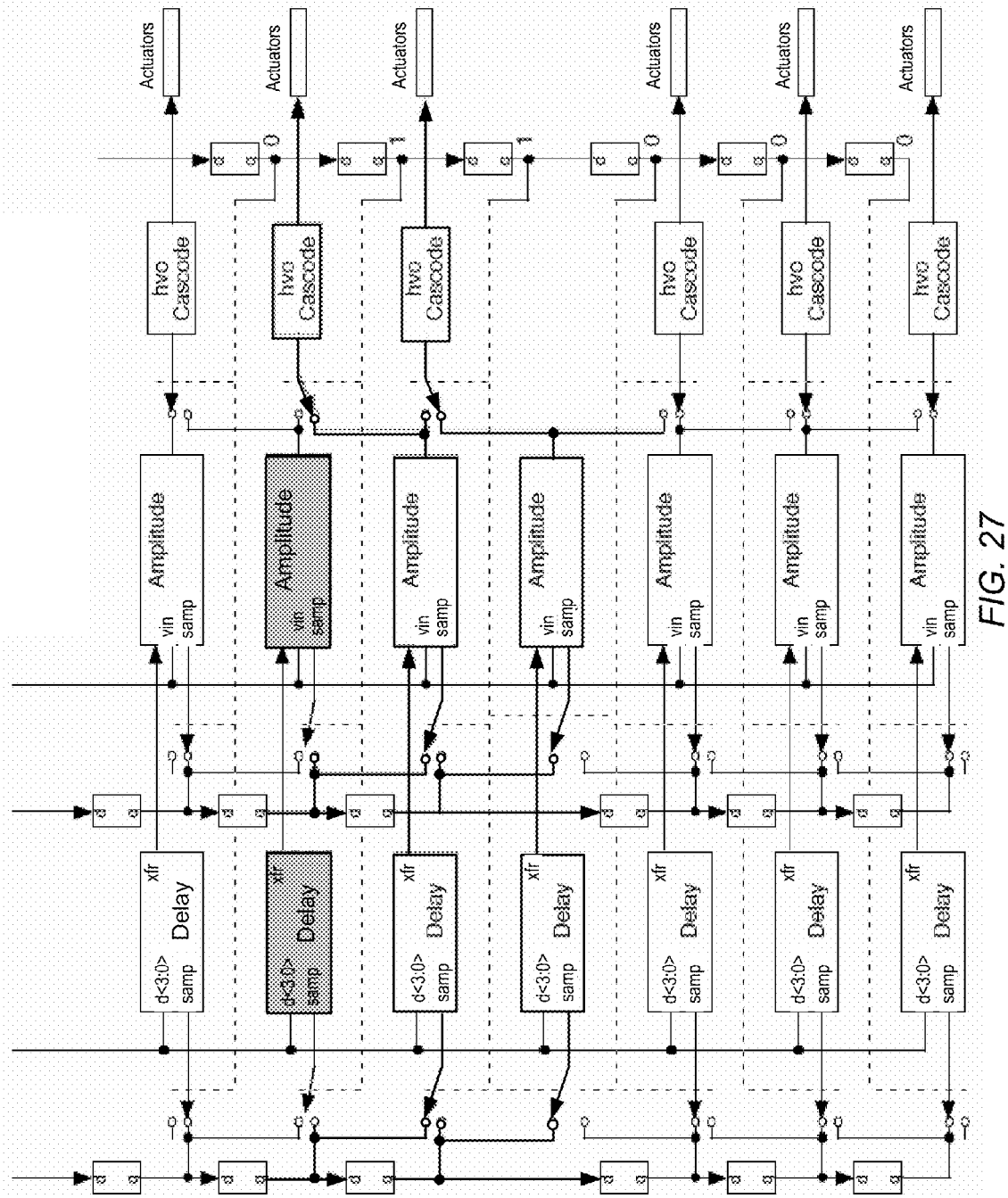
FIG. 27 is a schematic block diagram illustrating replacement of a single defective drive channel in a top half of an array of drive channels with a spare drive channel in the middle according to an embodiment of the present disclosure.

FIG. 27 is a schematic block diagram illustrating replacement of a single defective drive channel in a top half of an array of drive channels with a spare drive channel in the middle. This diagram shows what happens if the second driver is defective (red highlight). Observe how with the switching, the bad channel is switched out while the adjacent channel is switched over and the spare switched in.

Programming of the redundancy register is nearly the same as for the testability function. The main difference is that d2 and d3 are the redundancy 256b shift register data and clock inputs, respectively. Programming in the spare channel is done by programming in '1's in every bit position at the defective channel and all other channels between it and the center. For example, if driver 156 is bad, then bits 128-156 should be set HIGH. Again, if driver 73 is bad, then bits 73-127 should be set HIGH.

Thus, embodiments of monolithic integrated SLMs including PLVs™ or GLVs™ and methods of making and using the same have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the forgoing description, for purposes of explanation, numerous specific details have been set forth in order to provide a thorough understanding of the control system and method of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the control system or method. The appearances of the phrase "one embodiment" in various places in the specification do not necessarily all refer to the same embodiment. The term "to couple" as used herein may include both to directly electrically connect two or more components or elements and to indirectly connect through one or more intervening components.

What is claimed is:

1. An apparatus comprising:
a diffractive spatial light modulator (SLM) formed on a substrate, the SLM including a plurality of pixels each including a plurality of electrostatically deflectable actuators; and
a driver including a number of drive channels each coupled to one of the plurality of electrostatically deflectable actuators, each of the drive channels including at least one internal digital-to-analog converter (DAC) integrally formed on the same substrate as the SLM and adapted to receive a multi-bit DAC word,
wherein the multi-bit DAC word comprises 10 bits, including 6 most significant bits (MSBs) and 4 least significant bits (LSBs), and
wherein the at least one internal DAC comprises a charge integrating DAC in which a change in an output of the charge integrating DAC per clock cycle is 8 times greater for the MSBs than for the LSBs.

2. The apparatus of claim 1, wherein each of the drive channels further includes a high voltage (HV) gain circuit electrically coupled between the DAC and the electrostatically deflectable actuators, and wherein the HV gain circuit is implemented using HV-CMOS integrally formed on the same substrate as the SLM.

3. The apparatus of claim 1, wherein each of the drive channels further comprise a sample and hold (S/H) circuit electrically coupled between the DAC and the HV gain circuit.

4. The apparatus of claim 3, wherein the charge integrating DAC integrates a reference current ($I_{ref}$) to produce the output, and wherein the reference current supplied to the charge integrating DAC to resolve the MSBs is greater than the reference current to resolve the LSBS.

5. The apparatus of claim 4, wherein each of the drive channels does not include a buffer amplifier electrically coupled between the DAC and the S/H circuit.

6. The apparatus of claim 3, wherein the S/H circuit comprises a triple sample and hold architecture.

7. The apparatus of claim 3, wherein the driver is configured to operate using pulse width modulation (PWM).

8. The apparatus of claim 1, wherein the driver further comprises test circuitry to sequentially couple an attenuated output of each of the number of drive channels to a test pad enabling testing of the driver at a die level.

9. The apparatus of claim 8, wherein the number of drive channels comprises a spare drive channel not initially coupled to any of the actuators, and wherein the driver further comprises circuitry to upon detection of a defective drive channel de-couple the defective drive channel from an associated actuator and to couple the spare drive channel to an actuator.

10. The apparatus of claim 9, wherein the driver further comprises circuitry to switch each drive channel between the spare and the defective drive channel to an adjoining actuator until the spare is switched in and the defective drive channel is switched out.

11. The apparatus of claim 1, wherein the diffractive SLM comprises a diffractive ribbon-type SLM that use coherent light reflected from deflected ribbons and undeflected ribbons to constructively and destructively interfere, thereby modulating light incident on the diffractive SLM.

12. An apparatus comprising:
a diffractive spatial light modulator (SLM) formed on a substrate, the SLM including a plurality of electrostatically deflectable two dimensional (2D) modulators disposed above an upper surface of a substrate, each 2D modulator having a first light reflective surface exposed through an aperture in a tent member disposed above the plurality of 2D modulators, wherein the tent member comprises a second light reflective surface having an area substantially equal to an area of a sum of the first reflective surfaces so that light reflected from the first and second light reflective surfaces constructively or destructively interferes, modulating light incident on the array; and
a driver including a number of drive channels each coupled to one of the plurality of electrostatically deflectable 2D modulators, each of the drive channels including at least one charge integrating digital-to-analog converter (DAC) that integrates a reference current ($I_{ref}$), and in which a change in an output of the charge integrating DAC per clock cycle is reduced to resolve least significant bits of a multi-bit DAC word,
wherein the multi-bit DAC word comprises 10 bits, including 6 most significant bits and 4 LSBs, and wherein the change in the output per clock cycle to resolve the LSBs is ⅛ that of the change in the output cycle to resolve the MSBs of the multi-bit DAC word.

13. The apparatus of claim 12, wherein the DAC is integrally formed on the same substrate as the SLM.

14. The apparatus of claim 12, wherein each of the drive channels further comprise a sample and hold (S/H) circuit electrically coupled between the DAC and a high voltage (HV) gain circuit electrically coupled to the electrostatically deflectable 2D modulators, and wherein each of the drive channels does not include a buffer amplifier electrically coupled between the DAC and the S/H circuit.

* * * * *